(12) United States Patent
Kim

(10) Patent No.: US 8,922,529 B2
(45) Date of Patent: Dec. 30, 2014

(54) TOUCH SENSOR SYSTEM USING TOUCH POINT VIBRATION

(75) Inventor: Kwang-tae Kim, Daegu (KR)

(73) Assignee: Remote Solution Co., Ltd., Nam-Myeon (KR)

( * ) Notice: Subject to any disclaimer, the term of this patent is extended or adjusted under 35 U.S.C. 154(b) by 459 days.

(21) Appl. No.: 13/398,903

(22) Filed: Feb. 17, 2012

(65) Prior Publication Data

US 2012/0218204 A1    Aug. 30, 2012

(30) Foreign Application Priority Data

| Feb. 28, 2011 | (KR) | 10-2011-0017977 |
| Feb. 28, 2011 | (KR) | 10-2011-0018004 |
| Aug. 30, 2011 | (KR) | 10-2011-0087225 |
| Oct. 18, 2011 | (KR) | 10-2011-0106312 |
| Oct. 18, 2011 | (KR) | 10-2011-0106314 |
| Oct. 27, 2011 | (KR) | 10-2011-0110619 |
| Oct. 27, 2011 | (KR) | 10-2011-0110621 |

(51) Int. Cl.
G06F 3/043    (2006.01)
G09G 5/00    (2006.01)
G06F 3/041    (2006.01)

(52) U.S. Cl.
CPC ................... *G06F 3/0433* (2013.01)
USPC .............. 345/177; 345/156; 345/173

(58) Field of Classification Search
CPC .......................... G06F 3/043–3/0436
USPC ............ 345/156–184; 178/18.01–20.04
See application file for complete search history.

(56) References Cited

U.S. PATENT DOCUMENTS

| 5,852,261 A | * | 12/1998 | Toda ........................ 178/18.04 |
| 7,227,537 B2 | * | 6/2007 | Nakayama et al. .......... 345/173 |
| 7,439,118 B2 | | 10/2008 | Kanno |
| 7,601,579 B2 | | 10/2009 | Kanno |
| 7,864,161 B2 | | 1/2011 | Hollemans et al. |
| 8,466,893 B2 | | 6/2013 | Hollemans et al. |
| 2004/0061688 A1 | * | 4/2004 | Nakayama et al. .......... 345/173 |

(Continued)

FOREIGN PATENT DOCUMENTS

| JP | 05265636 A | 10/1993 |
| JP | 2008166846 A | 6/1996 |

(Continued)

OTHER PUBLICATIONS

Allowance of corresponding Korean application No. 10-2011-0106312.

(Continued)

*Primary Examiner* — Patrick F Marinelli
(74) *Attorney, Agent, or Firm* — Porzio, Bromberg & Newman, P.C.

(57) ABSTRACT

A touch sensor system using vibration at touch point is provided, which includes a first sensor bar having a piezoelectric grid formed on a side surface thereof, a second sensor unit having a piezoelectric grid formed on a side surface thereof, and connected at one end to an end of the first sensor bar in a perpendicular relation, a signal processing unit connected to the first and second sensor units to receive an electric signal, and a touch point calculating unit which calculates a location of touch with respect to a screen through which the touch is inputted, based on the electric signal received at the signal processing unit.

13 Claims, 38 Drawing Sheets

(56) References Cited

U.S. PATENT DOCUMENTS

| | | | |
|---|---|---|---|
| 2004/0133366 A1* | 7/2004 | Sullivan et al. | 702/56 |
| 2004/0160421 A1* | 8/2004 | Sullivan | 345/173 |
| 2004/0173389 A1* | 9/2004 | Sullivan | 178/18.04 |
| 2005/0165564 A1* | 7/2005 | Sullivan et al. | 702/56 |
| 2005/0243071 A1* | 11/2005 | Kent et al. | 345/177 |
| 2006/0109261 A1* | 5/2006 | Chou et al. | 345/177 |
| 2008/0132313 A1* | 6/2008 | Rasmussen et al. | 463/16 |
| 2009/0002328 A1 | 1/2009 | Ullrich et al. | |

FOREIGN PATENT DOCUMENTS

| | | | |
|---|---|---|---|
| JP | 09022325 A | 1/1997 | |
| JP | 09091080 A | 4/1997 | |
| JP | 2002342028 A | 11/2002 | |
| JP | 2003015814 A | 1/2003 | |
| JP | 2007244554 A | 9/2007 | |
| JP | 2009110248 A | 5/2009 | |
| KR | 100234990 B1 | 9/1999 | |
| KR | 1020080042560 A | 5/2008 | |
| WO | 2008020699 A1 | 2/2008 | |

OTHER PUBLICATIONS

English translation of Allowance of corresponding Korean application No. 10-2011-0106312.
Office Action of corresponding Japanese application No. 2012-023045.
Preliminary Notice of Reasons for Rejection of JP2012-023045, Jun. 11, 2013.
Notice of Preliminary Rejection, KR10-2011-0110623, Apr. 24, 2013.
Notice of Allowance, KR10-2011-0087225, Mar. 29, 2013.
Notice of Allowance, KR10-2011-0110619, Apr. 24, 2013.
Notice of Allowance, KR10-2011-0110621, Apr. 24, 2013.
Notice of Allowance, KR10-2011-0106314, Apr. 24, 2013.

* cited by examiner

FIG.7

| X AXIS | $P_{10}$ | $P_{20}$ | $P_{30}$ | $P_{40}$ | $P_{50}$ | ... |
| --- | --- | --- | --- | --- | --- | --- |
| | $t_{10}$ | $t_{20}$ | $t_{30}$ | $t_{40}$ | $t_{50}$ | ... |
| Y AXIS | $P_{01}$ | $P_{02}$ | $P_{03}$ | $P_{04}$ | $P_{05}$ | ... |
| | $t_{01}$ | $t_{02}$ | $t_{03}$ | $t_{04}$ | $t_{05}$ | ... |

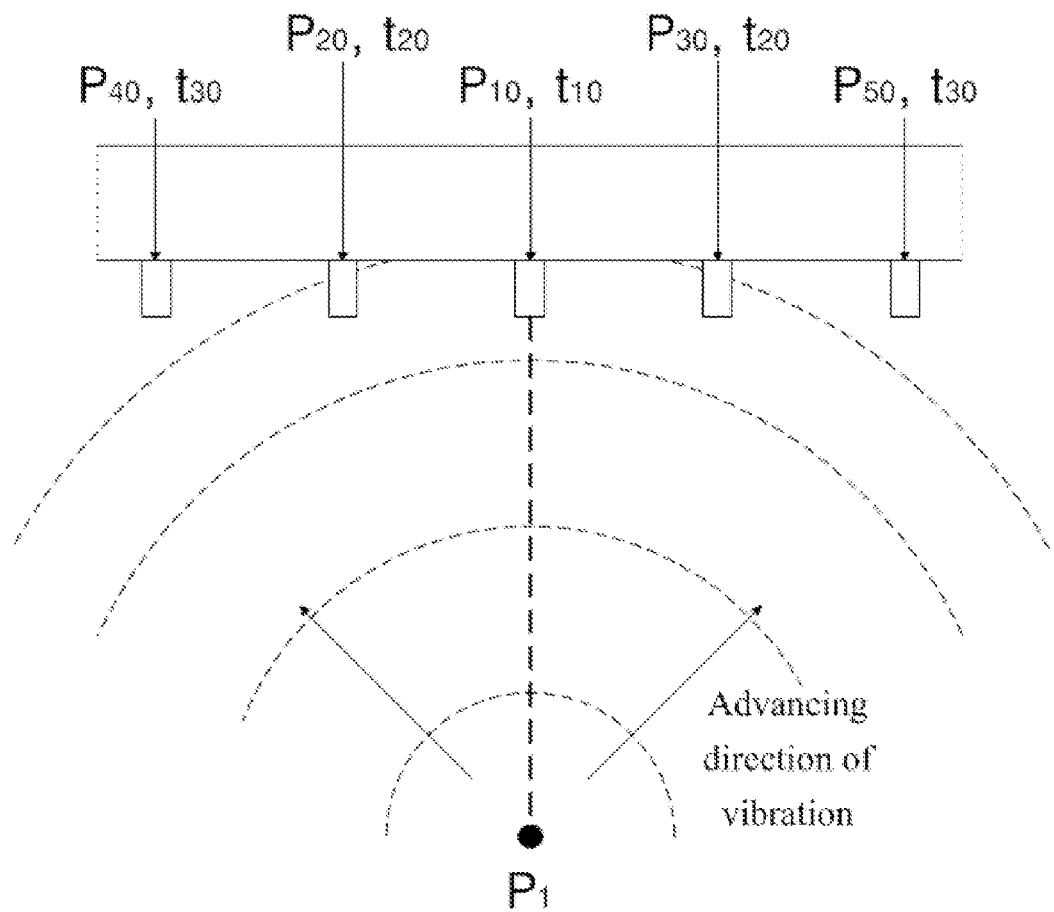

FIG.14

| X AXIS | $P_{10}$ | $P_{20}$ | $P_{30}$ | $P_{40}$ | $P_{50}$ | ... |
|---|---|---|---|---|---|---|
| | $t_{10}$ | $t_{20}$ | $t_{30}$ | $t_{40}$ | $t_{50}$ | ... |
| Y AXIS | $P_{01}$ | $P_{02}$ | $P_{03}$ | $P_{04}$ | $P_{05}$ | ... |
| | $t_{01}$ | $t_{02}$ | $t_{03}$ | $t_{04}$ | $t_{05}$ | ... |

TOUCH SENSOR SYSTEM USING TOUCH POINT VIBRATION

CROSS-REFERENCE TO RELATED APPLICATIONS

This application claims priority from Korean Patent Application No. 10-2011-0017977, filed on (Feb. 28, 2011), No. 10-2011-0018004, filed on (Feb. 28, 2011), No. 10-2011-0087225, filed on (Aug. 30, 2011), No. 10-2011-0106312, filed on (Oct. 18, 2011), No. 10-2011-0106314, filed on (Oct. 18, 2011), No. 10-2011-0110619, filed on (Oct. 27, 2011), No. 10-2011-0110621, filed on (Oct. 27, 2011), in the Korean Intellectual Property Office, the disclosure of which is incorporated herein by reference in its entirety.

BACKGROUND

1. Field of the Invention

Systems consistent with the disclosure provided herein relate to a touch sensor system, and more particularly, to a touch sensor system which receives vibration wave or elastic wave and determines a touch point accurately using the vibration received at the touch point.

2. Description of the Related Art

Display technologies, which were mostly focused on TVs or computer monitors, have recently been applied to the fields of mobile devices such as phones, PMPs, MP3, GPS for use in vehicles, and are expected to be further extended to the virtual displays. While conventional displays provide limited function of conveying visual information, there has been consistent demand for more convenient interface, and the displays have now been developed to provide function of keyboard or mouse, i.e., the function of window through which information can be inputted. Such display with multi-function is collectively called touch screen or touch panel.

While there are various technologies that have been introduced to implement touch screen, these technologies may be divided mainly into three schemes depending on manners of estimating a location at which an external touch is made.

First, the electric resistive touch panel is most widely used. The electric resistive touch panel is fabricated by forming longitudinal and transversal arrangement of transparent electrodes on the surface of the display window and coating a top thereof with insulating layer.

A conductance is connected at a point where the touch is made, and it is possible to discriminate the touch point from the transparent electrodes in longitudinal and transversal arrangement. Although the fabrication thereof is complicated, due to use of advanced semiconductor processing, relatively improved techniques and much simpler algorithms have enabled use of this technology to increase.

However, use of additional layers including the transparent electrodes which are mounted on the glass substrate compromises brightness. Accordingly, more power is necessary to output uncompromised brightness. However, this requirement is almost fatal to mobile display which consumes power from the low-capacity mobile power source. Further, since the fabrication technique is based on the semiconductor processing which deals with the entire substrate, it is practically not efficient for the manufacture of wide touch panels.

Second, touch panel by capacitance measurement may be used. This scheme places capacitance sensors on upper, lower, left and right outer sides on the touch panel and discriminates a location of touch when an object with predetermined potential such as a finger is placed on the touch panel, based on a difference of potentials charging the respective capacitance sensors. The capacitive touch panel provides good sensitivity and is particularly sensitive to finger movements.

However, the scheme is basically not applicable to the transparent substrate such as glass, so requires separate touch panel such as notebook pad, which can be a great obstacle to integration.

Lastly, a touch panel driven by elastic wave sensing may be used. Elastic wave transmitters/receivers may be arranged periodically on upper or lower portion of the touch panel, mostly represented by glass, and an elastic wave path is made on the touch panel surface using the elastic wave reflector. Accordingly, when an object absorbing elastic wave such as finger touches on the touch panel surface, offset of elastic wave at the touch point is detected and the exact location is determined based on the detection. This technique has gained much attention, particularly because the elastic wave transmitters/receivers, which do not contribute to the display, are placed on the outer side of the touch panel to thus enhance brightness of the light source.

However, the technique consumes much power to consistently output elastic wave even when there is no touch inputted. The requirement for arranging reflector of transmitters/receivers also causes the construction to be complicate.

As explained above, since various forms of conventional touch panels need to consume much power, it is difficult to apply the conventional touch panels to ultra-small mobile devices. Further, since the conventional technologies require complicated structure, these are particularly not easily applicable to the future wide displays. Accordingly, a new concept of touch panel is required, which has simpler structure and consumes less power.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to one embodiment, a technical objective is to provide a touch sensor system which has simple and easy construction, but is capable of determining a location of touch on a touch plate accurately and fast, is simple to fabricate, has economic unit price, and is applicable to a variety of devices.

According to a first aspect, a touch sensor system using touch point vibration, the touch sensor system may include a first sensor bar which comprises a grid made from a piezoelectric material formed on one side surface thereof, a second sensor bar which comprises a grid made from a piezoelectric material formed on one side surface thereof, a touch plate having the first and second sensor bars respectively coupled to transversal (X) and longitudinal (Y) side surfaces thereof, a signal processing unit connected to the first and second sensor bars to receive an electric signal, and a touch point calculating unit which calculates a location of touch with respect to the touch plate based on the electric signal received at the signal processing unit.

The touch plate may be made from a material with a constant vibration attenuation coefficient. The touch plate may be patterned into a matrix form. The grids may be at distance ranging between 10 nm and 100 nm.

The first and second sensor bars may be coupled to one of front, side or rear surfaces of the touch plate. The touch sensor system may additionally include a signal transmitting unit which transmits location information regarding the touch point calculated at the touch point calculating unit to outside.

Additionally, the touch point calculating unit may include a first grid information storage unit which stores information about two or more grids that received vibration; a noise determining unit which determines presence or absence of abnormality in a reception pattern of the signal stored at the first grid information storage unit; and a first grid information analyzing unit which, if determining at the noise determining unit that there is no abnormality in the reception pattern of the signal, calculates a location of the touch point based on the information stored at the first grid information storage unit.

The first grid information storage unit may store therein location information of the grid that received vibration and time information at which the grid received vibration.

The first grid information analyzing unit may calculate the location of touch point using the locations of the grid that first received vibration and the grids adjacent to the grid that first received vibration; time information at which the grids received vibration; and information about traveling velocity of the vibration on the touch plate.

Further, if the second and third grids on immediately adjacent sides to the first grid that first received vibration sense the vibration at the same time, the noise determining unit may determine presence and absence of abnormality in the reception pattern of the signal based on time at which fourth and fifth grids adjacent to the second and third grids receive the vibration.

Further, if the first and second grids adjacent to each other received vibration concurrently, the noise determining unit may determine presence and absence of abnormality in the reception pattern of the signal based on time at which the vibration is received at third and fourth grids which are adjacent to the first and second grids.

Further, among the second and third grids, which are on immediately adjacent sides to the first grid that received the vibration first, if the second grid first receives vibration, the noise determining unit may determine presence and absence of abnormality in the reception pattern of the signal based on time at which the vibration is received at the third grid, or time at which the vibration is received at the fourth grid adjacent to the second grid.

The grids may be at distance ranging between 10 nm and 100 nm.

The touch sensor system may additionally include a signal transmitting unit which transmits location information of the touch point calculated at the touch point calculating unit to outside.

The touch point calculating unit may include a first touch point calculating unit which calculates location of touch on the touch plate based on an electric signal received at the signal processing unit; and a second touch point calculating unit which converts the location of touch on the touch plate calculated at the first touch point calculating unit based on relative location with respect to a screen on which the location of touch is displayed.

The touch point calculating unit may additionally include a screen determining unit which determines location and size of the screen displayed on the touch plate, based on two or more location information regarding the location and size of the displayed screen.

Further, the touch point calculating unit may additionally include a screen determining unit which determines location and size of a screen displayed on the touch plate using an optical sensor which senses light from the displayed screen.

If a touch point deviating from the displayed screen is inputted, the second touch point calculating unit may determine that no touch is inputted.

Further, the touch point calculating unit may additionally include a set screen suggesting unit which displays on the touch plate information about location and size of a screen to be displayed on the touch plate.

Further, the touch point calculating unit may additionally include a screen determining unit which determines whether or not the location and size of the screen displayed on the touch plate match the location and size displayed by the set screen suggesting unit, using an optical sensor which senses light from the displayed screen.

The touch sensor system may additionally include a signal transmitting unit which transmits location information of the touch point calculated at the touch point calculating unit to outside.

Additionally, the touch point calculating unit may include a second grid information storage unit which stores information about two or more grids that received vibration; and a second grid information analyzing unit which calculates location of touch point based on the information stored at the second grid information storage unit.

The second grid information storage unit may store location information of the grid that receives vibration, and time information at which the grid receives vibration.

The second grid information analyzing unit may calculate location of touch point using locations of a grid that first received the vibration and grids adjacent to the grid that first received the vibration; time information at which the grids received vibration; and information about traveling velocity of the vibration at the touch plate.

With respect to the first grid that received the vibration first, if times at which second and third grids on immediately-adjacent left and right sides to the first grid received the vibration match, the second grid information analyzing unit may calculate the location of the vibration based on the location of the first grid that received the vibration first.

Further, with respect to the first grid that received the vibration first, if the second grid received the vibration first among the second and third grids on immediately-adjacent left and right sides to the first grid, the second grid information analyzing unit may calculate the location of the vibration based on one-fourths point in a direction from the first to second grids.

Further, if the first and second adjacent grids received the vibration at the same time, the second grid information analyzing unit may calculate the location of the vibration based on a half point between the first and second grids.

The grids may be at distance ranging between 10 nm and 100 nm.

The touch sensor system may additionally include a signal transmitting unit which transmits location information of the touch point calculated at the touch point calculating unit to outside.

According to a second aspect, a touch sensor system using touch point vibration may include a first sensor unit comprising a piezoelectric grid, a second sensor unit comprising a piezoelectric grid, a touch plate having the first and second sensor units respectively coupled to transversal (X) and longitudinal (Y) side surfaces thereof, a signal processing unit connected to the first and second sensor units to receive an electric signal, and a touch point calculating unit which calculates location with respect to the touch plate based on the electric signal received at the signal processing unit.

The touch plate may be preferably made from a material with a constant vibration attenuation coefficient. The touch plate may be patterned into a matrix form.

The grids may be at distance ranging between 10 nm and 100 nm.

The first and second sensor bars may be coupled to one of front, side or rear surfaces of the touch plate.

The touch sensor system may additionally include a signal transmitting unit which transmits location information regarding the touch point calculated at the touch point calculating unit to outside.

According to a third aspect, a touch sensor system using touch point vibration may include a first sensor bar having a piezoelectric grid formed on a side surface thereof, a second sensor unit having a piezoelectric grid formed on a side surface thereof, and connected at one end to an end of the first sensor bar in a perpendicular relation, a signal processing unit connected to the first and second sensor units to receive an electric signal, and a touch point calculating unit which calculates a location of touch with respect to a screen through which the touch is inputted, based on the electric signal received at the signal processing unit.

The touch sensor system may additionally include a bar fixing unit coupled to an end of each of the first and second sensor bars to fix the first and second sensor bars at a perpendicular relation with each other.

The touch sensor system may additionally include a boundary detecting unit which perceives a touch made outside a boundary line of an end of each of the first and second bars, and the boundary detecting unit may be a grid made from piezoelectric material.

The touch sensor system may additionally include a signal transmitting unit which transmits location information about the touch point calculated at the touch point calculating unit to outside.

Further, the touch sensor system may additionally include a first additional side bar which is formed at a location facing the second sensor bar and connected to other end of the first sensor bar, and a second additional side bar which is formed at a location facing the first sensor bar and connected to the other end of the second sensor bar.

The first and second additional side bars may each include a piezoelectric grid formed on a side surface thereof.

Further, the touch sensor system may additionally include a signal transmitting unit which transmits location information of the touch point calculated at the touch point calculating unit to outside.

According to a fourth aspect, a touch sensor system may include a translucent sheet having a piezoelectric grid formed on any of transversal (X) and longitudinal (Y) side lines; a signal processing unit connected to each of the grid to receive electric signal; and a touch point calculating unit which extracts the first electric signal of the transversal (X) and longitudinal (Y) lines among the signals received at the signal processing unit and calculates location of touch point using an intersecting point on an extended line from the extracted grid point.

The translucent sheet may preferably be patterned into matrix form, and made from glass material. The signal processing unit may include an analogue-to-digital (A/D) converter which converts an analogue signal into a digital signal.

Further, the touch point calculating unit may include a controller card which calculates location on the X and Y axes of the display, using the converted digital signal. The grid may be at distance ranging between 10 nm and 100 nm.

According to a fifth aspect, a touch sensor system may include a display unit including a display device and a touch screen device, a central processing unit (CPU) and a communicating unit, in which the touch screen device may include a translucent sheet having a piezoelectric grid formed on any of transversal (X) and longitudinal (Y) side lines; a signal processing unit connected to each of the grid to receive electric signal; and a touch point calculating unit which extracts the first electric signal of the transversal (X) and longitudinal (Y) lines among the signals received at the signal processing unit and calculates location of touch point using an intersecting point on an extended line from the extracted grid point.

The mobile device may be one of mobile phone, PDA, and tablet PC, and the translucent sheet may be patterned into a matrix form.

Further, the signal processing unit may include an analogue-to-digital (A/D) converter which converts an analogue signal into a digital signal, and the touch point calculating unit may include a controller card which calculates the location on the X and Y axes of the display, using the converted digital signal. The grid may be formed on a lower edge of the translucent sheet, while there may be a window frame formed on an upper edge of the translucent sheet to distinguish the grid pattern.

According to a sixth aspect, a touch sensor system may include a translucent sheet having a piezoelectric grid formed on a first line of any of transversal (X) and longitudinal (Y) side lines and on a second line of the other of transversal (X) and longitudinal (Y) side lines facing the first line; a signal processing unit connected to each of the grid of the first and second lines to receive electric signal; and a touch point calculating unit which extracts the signal of each line from among the electric signals of the first and second lines received at the signal processing unit and calculates location of touch point by calculating arithmetic mean of an intersecting point on respectively extended lines from the first signal grid point.

The translucent sheet may preferably be patterned into matrix form, and made from glass material. The signal processing unit may include an analogue-to-digital (A/D) converter which converts an analogue signal into a digital signal.

Further, the touch point calculating unit may include a controller card which calculates location on the X and Y axes of the display, using the converted digital signal. The grid may be at distance ranging between 10 nm and 100 nm.

According to a seventh aspect, a touch sensor system may include a display unit including a display device and a touch screen device, a central processing unit (CPU) and a communicating unit, in which the touch screen device may include a translucent sheet having a piezoelectric grid formed on a first line of any of transversal (X) and longitudinal (Y) side lines and on a second line of the other of transversal (X) and longitudinal (Y) side lines facing the first line; a signal processing unit connected to each of the grid of the first and second lines to receive electric signal; and a touch point calculating unit which extracts the signal of each line from among the electric signals of the first and second lines received at the signal processing unit and calculates location of touch point by calculating arithmetic mean of an intersecting point on respectively extended lines from the first signal grid point.

The mobile device may be one of mobile phone, PDA, and tablet PC, and the translucent sheet may be patterned into a matrix form. The translucent sheet may be patterned into a matrix form, and the signal processing unit may include an analogue-to-digital (A/D) converter which converts an analogue signal into a digital signal.

The touch point calculating unit may include a controller card which calculates location on the X and Y axes of the display, using the converted digital signal. The grid may be formed on a lower edge of the translucent sheet, while there may be a window frame formed on an upper edge of the translucent sheet to distinguish the grid pattern.

Accordingly, a touch sensor system is provided, which has simple and easy construction, but is capable of determining a location of touch on a screen accurately and fast. The touch sensor system is simple to fabricate, has economic unit price, and is applicable to a variety of devices.

The touch sensor system also provides advantages including: a reduced number of necessary peripherals, and less extra power for the sensor system.

Accordingly, a touch sensor system is provided, which has simple and easy construction, but is capable of determining a location of touch on a touch plate accurately and fast. The touch sensor system is simple to fabricate, has economic unit price, and is applicable to a variety of devices.

The touch sensor system also provides advantages including: a reduced number of necessary peripherals, and less extra power for the sensor system.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 7 illustrates a structure of grid information stored at a first grid information storage unit 43 according to another embodiment;

FIGS. 8A and 8B are views illustrating a process of determining absence/presence of reception pattern abnormality of a signal due to contaminant in a touch sensor system using vibration at a location of point, according to another embodiment;

FIG. 14 is a view illustrating a structure of grid information stored at a grid information storage unit according to an embodiment;

DETAILED DESCRIPTION OF EXEMPLARY EMBODIMENTS

Figure 1:
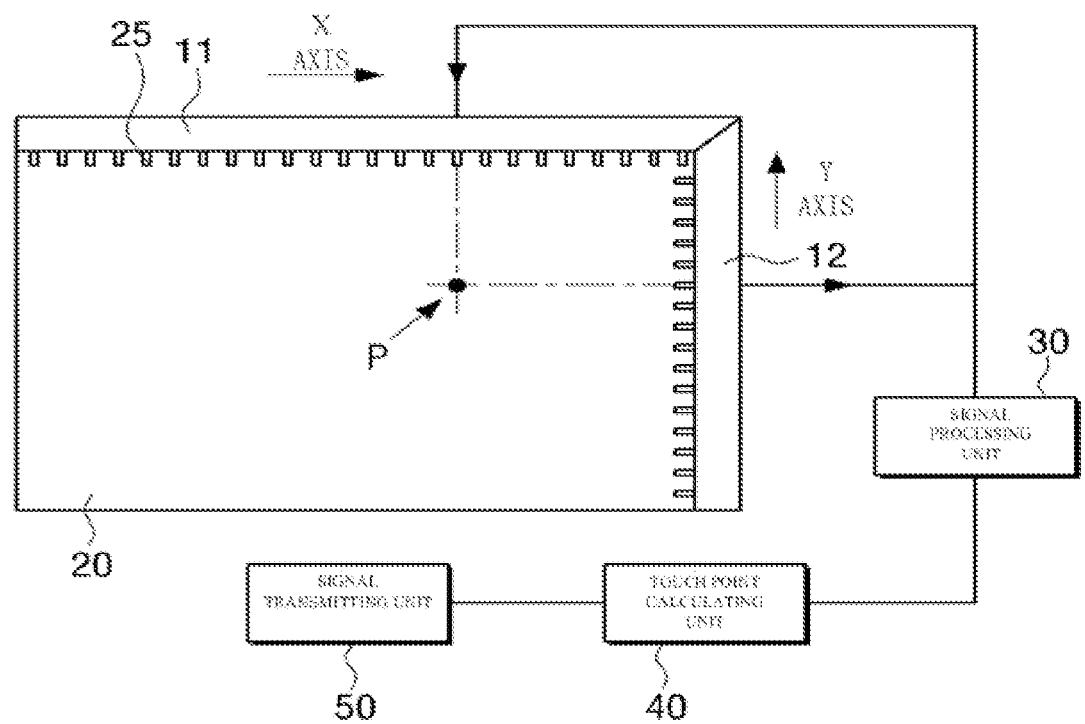
FIG. 1 is a schematic, block diagram of a touch sensor system using vibration at a location of touch, according to an embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 is a schematic, block diagram of a touch sensor system using vibration at a location of touch, according to an embodiment. Referring to FIG. 1, the system according to an embodiment may include a first sensor bar 11 having a grid made from piezoelectric material formed on a side surface; a second sensor bar 12 having a grid made from piezoelectric material formed on a side surface; a touch plate 20 on which the first and second sensor bars 11, 12 are coupled on a transversal (X) and a longitudinal (Y) side surfaces, respectively; a signal processing which is connected to the first and second sensor bars 11, 12 to receive an electric signal; a touch point calculating unit 40 which extracts the signal received at the signal processing unit 30 and calculates the location of touch; and a signal transmitting unit 50 which transmits information about the calculated location of touch to outside.

The first sensor bar 11 having the grid made from piezoelectric material formed on a side surface may be coupled to the transversal (X) side line, while the second sensor bar 12 having the grid made from piezoelectric material may be coupled to the longitudinal (Y) side line of the touch plate 20.

In one embodiment, the first and second sensor bars 11, 12 may be provided in the form of elongated bars lengthwise along the side lines, in polyhedron shapes with rectangular or triangular cross-sections, or spherical shapes with circular or oval cross-sections.

The first and second sensor bars 11, 12 may be coupled to the side lines of the touch plate 20, and more particularly, to any of front, side or rear surfaces of the side lines. Accordingly, the first and second sensor bars 11, 12 may be coupled to desirable surface of the side lines according to choice of those skilled in the art.

Further, in one embodiment, when the first and second sensor bars 11, 12 may be coupled to the side lines of the touch plate 20, an end of the first sensor bar 11 and an end of the second sensor bar 12 may be structurally connected with each other. Manner of the connecting may be appropriately implemented by the choice of those skilled in the art, between a separable coupling and integrated coupling which does not enable disconnecting.

Figure 4A:
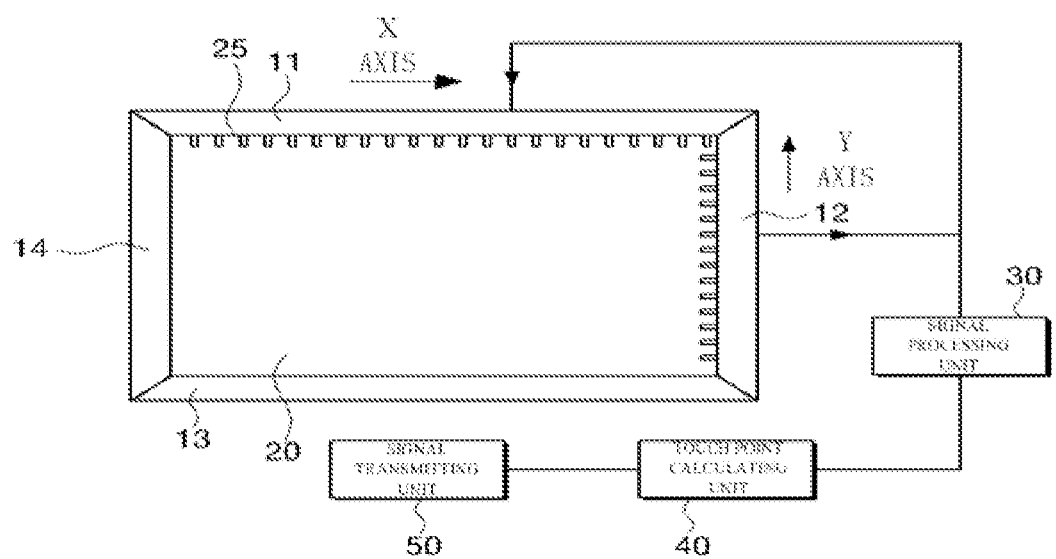
FIGS. 4A and 4B are schematic, block diagrams of a touch sensor system using vibration at a location of touch, in which additional side bars corresponding to a first sensor bar and a second sensor bar are coupled to the side lines of the touch plate to which the first and second sensor bars are not coupled.
Figure 4B:
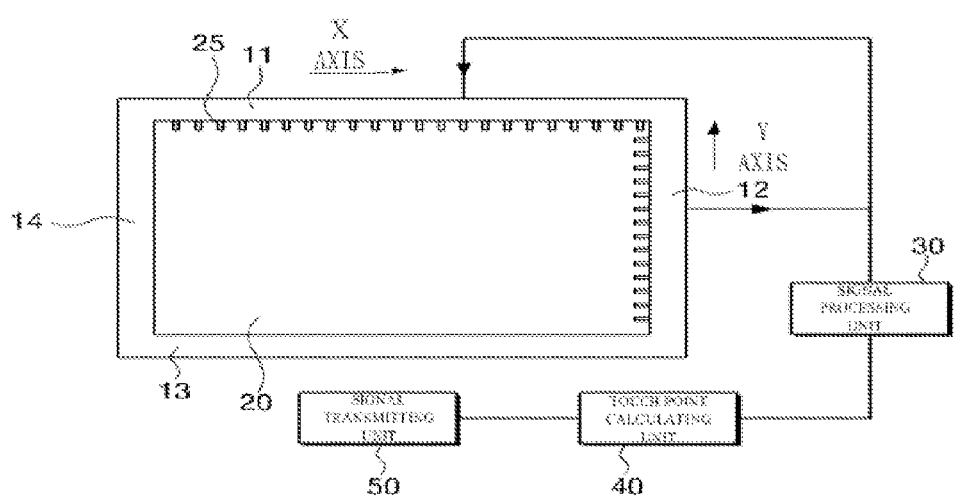

If integrated coupling is implemented, the portion corresponding to the transversal (X) side surface of the touch plate 20 corresponds to the first sensor bar 11, and the portion corresponding to the longitudinal (Y) side surface of the touch plate 20 corresponds to the second sensor bar 12. This will be explained in greater detail below with reference to FIG. 4.

In one embodiment, the touch plate 20 plays the role of conveying the vibration, which is generated by touch on a predetermined point on the plate 20, to the transversal (X) and longitudinal (Y) side surfaces. A screen for touching may be displayed on a front or rear surface of the touch plate 20, or provided separately on a printed paper and attached to the plate 20. In one embodiment, the touch plate 20 may be preferably made from a material with lower vibration attenuation coefficient such as glass, plastics, or wooden plate, which provides higher vibration transmissibility to transfer the vibration generated by the touch on the predetermined location to the transversal (X) and longitudinal (Y) side surfaces. By doing so, vibration or elastic waves can be transferred from the location of touch to the grid 25 with less loss, to thereby induce stress at the grid 25 and increase efficiency of generating electric signal.

The signal processing unit 30 may preferably include an analogue-to-digital (A/D) converter to convert the analogue electric signal generated at the grid 25 into digital signal. The A/D converter may be a device to convert a measurement signal with respect to general analogue physical quantity into a digital signal.

It is necessary to measure analogue physical quantities such as voltage, current, temperature, humidity, pressure, flow rate, velocity, or acceleration, convert the measurement into digital value and read in the converted values, and Data Acquisition System (DAS) does the above-mentioned functions. The DAS may include a sensor, an A/D converter, and a computer.

The sensor operates to convert physical quantity to be measured into electrical quantity such as voltage, current or frequency, and the A/D converter operates to convert the sensed value into parallel or serial data which is readable on a computer. In most cases, a filter to remove noise between the sensor and the A/D converter and exclusively extract intended signal, or a wave shaping circuit such as an amplifier to convert the signal into an appropriate size, may be implemented.

As explained above, the signal processing unit 30 in one embodiment may additionally include a device such as filter or amplifier to measure elastic wave at the piezoelectric grid 25 and convert the measured signal into a digital signal for analysis to generate measurement or reception signal accurately and efficiently to thus enable the touch point calculating unit 40 to calculate the location of touch accurately.

In one embodiment, depending on choice by those skilled in the art, the touch point calculating unit 40 may include a calculating unit including micro controller unit (MCU) and a controller card which calculates the location. The controller card may convert the digital signals from the respective grid points extracted at the signal processing unit 30 into matrix coordinate system on the touch plate 20 and designate an exact location. Such controller card enables to extract X and Y coordinates of the received signal on the grid 25, so that the MCU extracts the X and Y coordinates on the grid 25 of the initial signal and calculates the location of point.

In the above-explained structure, if a user touches a predetermined point on the touch plate 20, vibration or elastic wave is generated from the point ("touch point"). The generated elastic wave is transferred in all directions by way of the touch plate 20, and reaches the grid 25 formed on the first and second sensor bars 11, 12. As the elastic wave transferred from the touch point reaches the respective grids 25, and the grids 25 made from piezoelectric material are subject to pressure or stress due to the elastic wave, to thereby generate an electric signal.

The electric signals received from the respective grids 25 are received at the signal processing unit 30, and converted into digital signal so that the touch point calculating unit 40 analyzes the digital signal to calculate the location of touch. In one embodiment, the touch point calculating unit 40 may extract the location on the grid 25 where, among the above-mentioned signals, the elastic wave signal is first received. If the location on the grid 25 is calculated, an intersecting point is extracted from the extended lines from the grid 25 extracted from a matrix of the touch plate 20, and the intersecting point is calculated as the touch point.

As used herein, the 'elastic wave' refers to all types of elastic wave including longitudinal and transversal waves that need medium, since the elastic wave conveys energy due to change in disturbance status in an elastic medium. An example of elastic wave includes sound wave which mainly uses air as medium, water wave which uses water as a medium, or seismic wave which uses interior substance of Earth. The elastic wave is frequently called dynamic wave, since the wave energy exists in the form of kinetic energy and potential energy. On the contrary, electromagnetic wave is non-elastic wave since this is transmitted without requiring a medium.

The elastic wave is transmitted in the same form as the vibration wave in the medium like touch plate 20. When a user touches the touch plate 20, the elastic wave starts propagating from the location of touch. The elastic wave first reaches the grid 25 in the shortest distance from the location of touch, and this point corresponds to the touch point grid spot to calculate the location of touch.

Each grid 25 at the location of touch absorbs elastic wave or vibration wave, and since the grid 25 is made from piezoelectric material, distortional stress of the grid 25 due to wave energy is applied, and as a result, the piezoelectric grid 25 generates an electric signal. Gaps between the grids 25 may preferably be formed in nano-scale to enable accurate determination of the location of touch, and increase sensitivity to vibration.

The piezoelectric material has induced polarization in response to an external mechanical pressure applied thereto or mechanical deformation due to external electromagnetic field. Crystal used in electric watch is the representative example thereof. If weak electricity is applied to the crystal, vibration occurs with frequency corresponding to the orientation or size of the crystal, in which the number of vibrations is calculated for use in watches.

PZT is the most widely used piezoelectric material, and has the constitution of $Pb(Zr, Ti)O^3$. The piezoelectric material is used in various applications including gas range ignition, ultrasound oscillator (for use in humidifier, ultrasound detector, nondestructive inspection), or piezoelectric transformer. The recent development has enabled very precise displacement, and various researches have been actively conducted to find the ways of using piezoelectricity in the field of actuator including atomic force microscopy (AFM), ultrasound motor, or the like.

As explained above, the piezoelectric grids 25 are subject to mechanical pressure or stress due to elastic wave applied in response to touch, and as a result, polarization is induced and electric signal is generated. The electric signal is electrically connected to the signal processing unit 30 by the grids 25 and wires.

The signal processing unit 30 converts the analog signal received at the respective grids 25 into digital signal, and divides the received signals at each point on the grid 25 along the extracted transversal and longitudinal axes by time or order of reception.

The touch point calculating unit 40 extracts the electric signal which is first received electric signal at each point on the grid 25, sets X and Y coordinates of the touch point (P) based on the point on the grid 25 where the electric signal is received, and calculates the location of the touch point.

The signal transmitting unit 50 transmits location information of the touch point calculated at the touch point calculating unit 40 to outside. As used herein, the 'outside' refers to an external computing device which needs the location information of the touch point. If the external device and the signal transmitting unit 50 are connected to each other by wire, the location information may be transmitted through the wire. If the external device and the signal transmitting unit 50 are communicatively connected to each other in wireless manner, it is also possible to transmit the location information of the touch point wirelessly. An embodiment is not limited to the manner of wireless communication. Accordingly, direct communication by Bluetooth, or alternatively, indirect communication by WiFi may be implemented. Further, various other types of wireless communication such as Zigbee, WLAN, or HomeRF may be adequately implemented.

As explained above, an embodiment relates to a system and a method for finding an accurate location of touch point by utilizing vibration wave or elastic wave generated in response to touch, in which the piezoelectric grid 25 generates an electric signal in response to stress by the wave, and the signal processing unit 30 and the touch point calculating unit 40 receive the signal, extract the first signal, and set X and Y coordinates based on the same.

Figure 2:
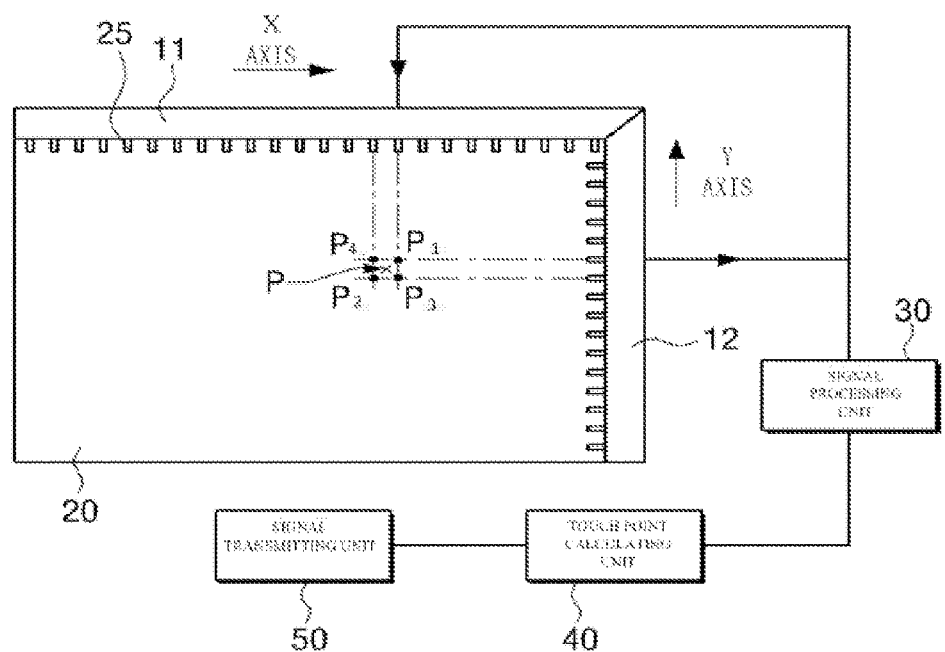
FIG. 2 is a schematic, block diagram of a touch sensor system using vibration at a location of touch, according to another embodiment.

FIG. 2 is a schematic, block diagram of a touch sensor system using vibration at a location of touch, according to another embodiment. Referring to FIG. 2, the elastic wave propagating from the touch point may reach two or more grids 25 formed on the transversal (X) or longitudinal (Y) side surfaces concurrently. In such a case, it is possible to extract the location of touch point (P) based on the arithmetic mean of a plurality of locations of touch points (P). For example, if the two of the grids on the transversal (X) side surfaces and the two of the grids on the longitudinal (Y) side surface first receive the elastic wave concurrently, referring to FIG. 2, four intersecting points ($P_1$, $P_2$, $P_3$, $P_4$) may be generated. Accordingly, a touch point may be calculated based on the arithmetic mean of these values.

As explained above, in one embodiment, two or more intersecting points are extracted, and the arithmetic mean of these values is set to be the touch point (P). Accordingly, the accuracy of finding the touch point improves.

Figure 3:
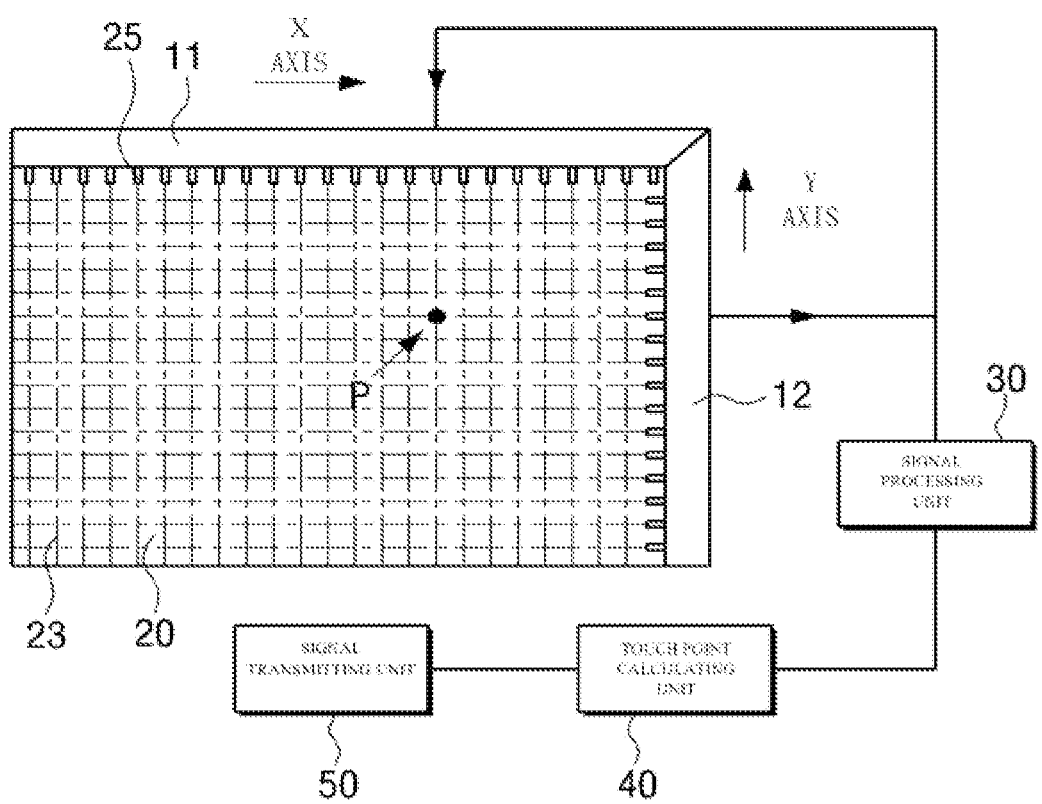
FIG. 3 is a schematic, block diagram of a touch sensor system using vibration at a location of touch, in which a touch plate is patterned, according to another embodiment.

FIG. 3 is a schematic, block diagram of a touch sensor system using vibration at a location of touch, in which a touch plate is patterned, according to another embodiment. Referring to FIG. 3, the embodiment has the mostly identical structure as that of FIG. 1, except for the fact that the touch plate 20 is patterned in the matrix form.

An embodiment may be based on a principle in which the vibration wave or elastic wave propagates in all directions from the location of touch point (P) in response to a touch on the display, which means that the shortest path between the touch point (P) and the grid is linear. Accordingly, in one embodiment, a trench pattern in matrix form may be formed with a predetermined thickness and at predetermined distance on the surface of the touch plate 20. In such an embodiment, the transmissibility of the elastic wave increases and noise wave decreases, so that responsiveness and accuracy improve. Of course, it is possible to design the pattern based on suitable thickness and distance by comprehensively considering the highest responsiveness and accuracy.

FIG. 4 is a schematic, block diagram of a touch sensor system using vibration at a location of touch, in which additional side bars 13, 14 corresponding to a first sensor bar 11 and a second sensor bar 12 are coupled to the side lines of the touch plate 20 to which the first and second sensor bars are not coupled.

The additional side bars 13, 14 may be provided to increase user convenience in using the touch sensor system, and also to structurally support the first and second sensor bars 11, 12. The additional side bars 13, 14 may have piezoelectric grids such as the first and second sensor bars 11, 12 formed on one side surface thereof.

In one embodiment, the first sensor bar 11, the second sensor bar 12, and an adjacent end of each of the additional the additional side bars 13, 14 connected to the locations corresponding to the respective sensor bars 11, 12 may be separably connected to each other (FIG. 4A), or integrated with each other (FIG. 4B) which does not allow disconnecting.

Figure 5:
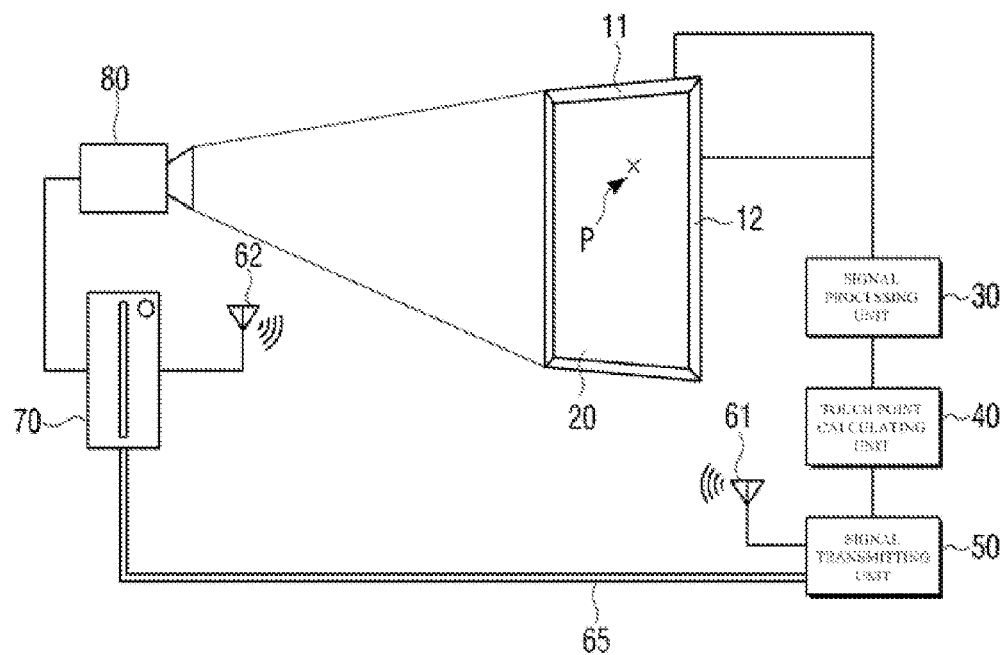
FIG. 5 illustrates an example of a touch sensor system using vibration of touch, according to another embodiment.

FIG. 5 illustrates an example of a touch sensor system using vibration of touch, according to another embodiment. Referring to FIG. 5, based on the touch sensor system using touch point vibration according to an embodiment, touch is inputted to a screen projected by a projector 80 and information about the touch point is provided to the external computing device 70.

Referring to FIG. 5, an embodiment may include a touch plate 20 having a first sensor bar 11 and a second sensor bar 12 respectively to transversal (X) and longitudinal (Y) side surfaces, in which the first and second sensor bars 11, 12 each has a piezoelectric grid (not illustrated) formed on one side thereof a signal processing unit 30 connected to the first and second sensor bars 11, 12 to receive an electric signal; a touch point calculating unit 40 which calculates a location of touch with respect to the touch plate 20 based on the electric signal received at the signal processing unit 30; a signal transmitting unit 50 which transmits location information of the calculated touch point to the external computing device 70 by wireless communication 61 or via wire 65; the computing device 70 which generates a screen for receiving a specific location-based job, and receives the location information of the touch point corresponding to the screen from the signal processing unit 50 by the wireless communication 62 or via the wire 65; and a projector 80 which projects on the touch plate a screen for receiving the specific location-based job generated at the computing device 70.

In one embodiment, if the computing device 70 generates the screen for receiving a touch input and transmits the same to the projector 80, the projector 80 displays the received screen on the touch plate 20. If there is a touch input (P) with respect to the screen displayed on the touch plate 20, the first and second sensor bars 11, 12, the signal processing unit 30 and the touch point calculating unit 40 calculate location information about the touch point (P) where the touch is made. The location information about the calculated touch point (P) is transmitted to the computing device 70 through the signal transmitting unit 50, and if the signal transmitting unit 50 and the computing device 70 are respectively equipped with wireless communication devices 61, 62 and wirelessly connected to each other, the location information about the touch point (P) may be transmitted wirelessly, or if the signal transmitting unit 50 and the computing device 70 are connected to each other through wire 65, the location information of the touch point (P) is transmitted through the wire 65.

In another embodiment, if any point on the touch plate 20 is touched, the vibration or elastic wave is generated from the touched point. As a result, the elastic wave propagates in all directions using the touch plate 20 as a medium and with velocity which may be expressed by:

$$v(t) = v_o - v_d(t) \qquad \text{[Mathematical expression 1]}$$

where, v(t) denotes velocity of elastic wave at time (t), $v_o$ is initial velocity of elastic wave generated in response to touch, and $v_d(t)$ is a reduction of velocity of elastic wave in accordance with unique attenuation coefficient of the touch plate 20. Generally, if the material and thickness of the touch plate 20 are determined, $v_o$ and $v_d(t)$ may be easily calculated. Accordingly, the elastic wave propagates from the touch point with the velocity v(t) and reaches the grids 25 formed on the first and second sensor bars 11, 12, in response to which the each piezoelectric grid 25 is subject to pressure or stress by the elastic wave to generate electric signal.

The electric signal, if generated from each grid 25, is received at the signal processing unit 30 and converted into a digital signal. The touch point calculating unit 40 analyzes the digital signal to thus calculate the location of the touch point. In one embodiment, the touch point calculating unit 40 may extract the location of the grid 25 which is the first one that received the elastic wave signal. If the location of the grid 25 is calculated, lines are extended from the location of the grid 25 extracted on the matrix of the touch plate 20 so that an intersecting point is extracted and calculated as the touch point.

Meanwhile, if contaminant exists on the touch plate 20, the elastic wave generated in response to touch may be affected to have delay or refraction. Accordingly, if the elastic wave is not transmitted to the grid 25 sequentially, an abnormality (i.e., noise) is generated in the reception signal pattern. The touch point calculating unit 40 detects such abnormality and prevents unintended erroneous input due to presence of contaminant.

Figure 6:
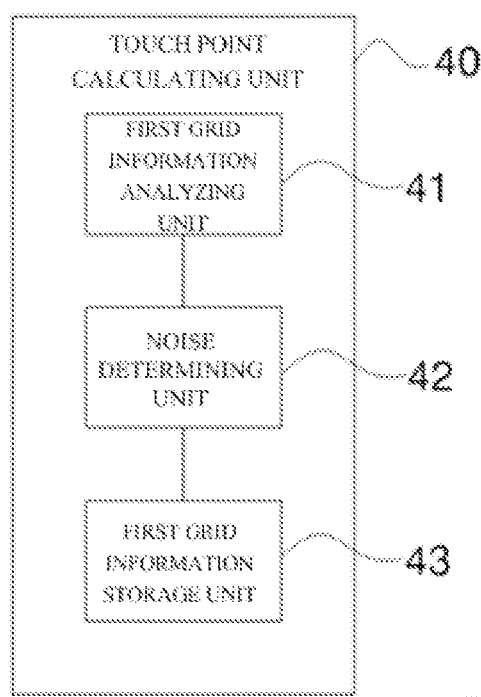
FIG. 6 is a block diagram of a touch point calculating unit according to another embodiment.

FIG. 6 is a block diagram of a touch point calculating unit according to another embodiment. Referring to FIG. 6, in one embodiment, the touch point calculating unit 40 may include a first grid information storage unit 43 which stores therein information about two or more grids that receive vibration, a noise determining unit 42 which determines presence or absence of abnormality in the signal reception pattern stored in the first grid information storage unit, and a first grid information analyzing unit 43 which calculates the location of touch point based on the information stored in the first grid information storage unit 43.

The first grid information storage unit 43 may store information about the grids which receive elastic wave generated in response to touch. The received grid information according to an embodiment, which is stored in the grid information storage unit 43, will be explained in greater detail below with reference to FIG. 7.

FIG. 7 illustrates a structure of grid information stored at a first grid information storage unit 43 according to another embodiment. To be specific, the grid information may include grid identification information ($P_{10}, P_{20}, P_{30}, P_{40}, P_{50} \ldots P_{01}, P_{02}, P_{03}, P_{04}, P_{05} \ldots$) and time information at which the respective grids sense the vibration ($t_{10}, t_{20}, t_{30}, t_{40}, t_{50} \ldots t_{01}, t_{02}, t_{03}, t_{04}, t_{05} \ldots$).

In another embodiment, a touch sensor system using touch point vibration may check the location of touch point based on the location of the grids which receive the elastic wave transmitted from the touch point and the time of receiving the elastic wave. Accordingly, the touch sensor system may give identification numbers to distinguish the respective grids formed on one side surfaces of the first and second sensor bars 11, 12. The detailed system of giving identification numbers may be determined by the choice of those skilled in the art. In one desirable embodiment, the grids formed on the first sensor bar 11 may be distinguished from the grids formed on the second sensor bar 12.

Preferably, since the first and second sensor bars 11, 12 with the grids formed thereon are formed on the transversal (X) and longitudinal (Y) side lines of the touch plate 20, referring to FIG. 7, the grid information storage unit 43 may distinctively store the grid identification information with respect to each of the transversal (X) and longitudinal (Y) side lines and the time information of sensing the vibrations of each grid.

Referring to FIG. 7, the elastic wave generated in response to touch is firstly received at the $P_{10}$ grid formed on the first sensor bar 11 in the transversal (X) direction, and at time $t_{10}$. Next, the $P_{20}$ grid receives the elastic wave at $t_{20}$, followed by the $P_{30}$ grid which receives the elastic wave at $t_{30}$. Further, the elastic wave generated in response to touch is firstly received at $P_{01}$ grid formed on the second sensor bar 12 in the longitudinal (Y) direction, at time $t_{01}$. Then $P_{02}$ grid receives the elastic wave at $t_{02}$, and $P_{03}$ grid receives the vibration at $t_{03}$.

The first/second grid information analyzing unit 48 calculates the location of touch point using the location of the first grid that received the vibration and locations of the grids adjacent to the grid, time information at which the grids received the vibration, and information about traveling speed v(t) of the vibration propagating in a medium (i.e., touch plate 20). That is, using the traveling speed of the vibration propagating in the medium of touch plate 20 and the relative time information at which the respective grids receive the vibration, it is possible to calculate the traveling distance of the vibration and based on this, calculate the location of the touch point in transversal (X) and longitudinal (Y) directions.

In another embodiment, a process of determining presence and absence of abnormality in the signal reception pattern due to the presence of contaminant through the noise determining unit 42, will be explained, when elastic wave, which is generated in response to touch on a specific point on the touch plate 20 inputted at a location on a orthogonal extended line of the first grid ($P_{10}$), is received at the respective grids 25 of the touch sensor system.

FIG. 8A illustrates a process in which the elastic wave, generated in response to touch, is transmitted to the grid 25 directly, i.e., without having refraction or delay, since there is no contaminant on the touch plate 20. That is, the vibration or elastic wave, generated in response to touch, is received first at the first grid ($P_{10}$) formed on the sensor bar at time ($t_{10}$), and then received at the second and third grids ($P_{20}$, $P_{30}$) adjacent to the first grid ($P_{10}$) at the same time ($t_{20}$). Next, the vibration is received at the adjacent fourth and fifth grids ($P_{40}$, $P_{50}$) on the left and right sides of the second and third grids ($P_{20}$, $P_{30}$) at the same time ($t_{30}$).

If vibration is received in the pattern explained above, i.e., if the second and third grids immediately adjacent to the first grid that received the vibration first sense the vibration at the same time ($t_{20}$), abnormality of the signal reception pattern may be determined based on whether or not the fourth and fifth grids adjacent to the second and third grids sense the vibration also at the same time ($t_{30}$).

Alternatively, considering that it is possible to calculate the traveling distance of the elastic wave by multiplying the traveling velocity by time, it is possible to calculate the estimated time to receive the elastic wave at the respective grids ($P_{40}$, $P_{50}$) and determine presence or absence of the abnormality in the signal reception pattern. Herein, the traveling velocity of the elastic wave on the touch plate 20 is v(t), and distances between the respective grids are known. That is, the noise determining unit 42 compares the calculated estimated time with the actual time ($t_{30}$) at which the vibration is received at the respective grids, to determine presence or absence of abnormality in the signal reception pattern depending on the matching of the information. Referring to FIG. 8A, since there is not contaminant present on the touch plate 20, the calculated estimate time and the actual vibration reception time correspond to each other. Accordingly, it is determined that there is no abnormality in the signal reception pattern.

Figure 8B:
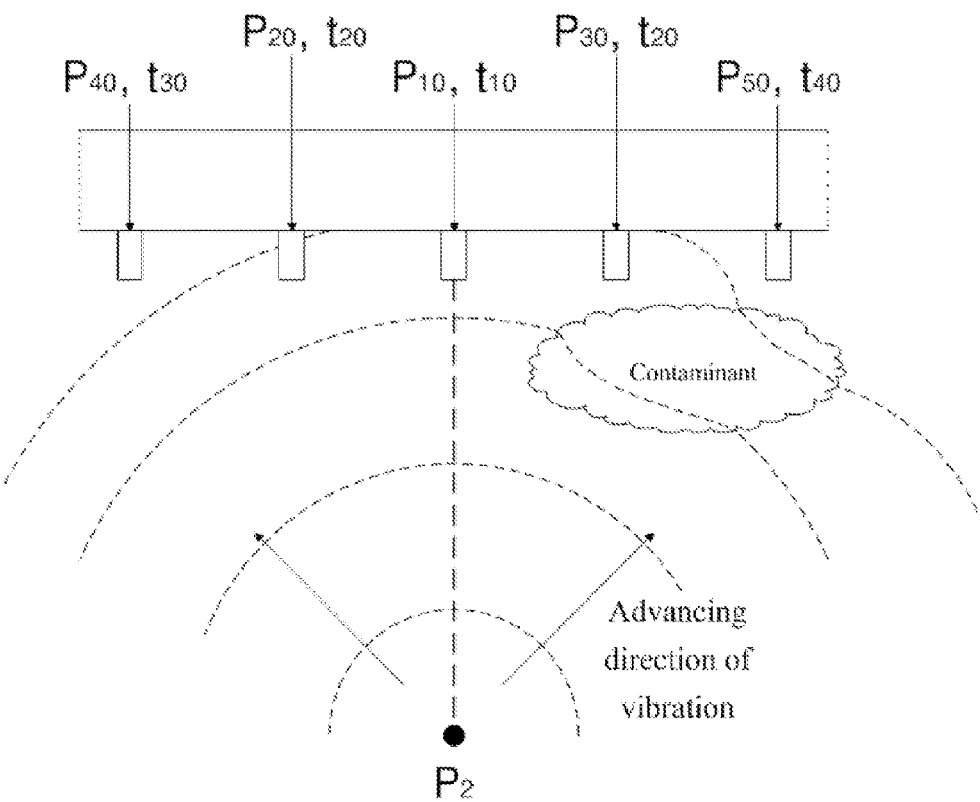

FIG. 8B illustrates a process in which elastic wave, which is generated in response to touch, is subject to refraction or delay due to presence of contaminant on the touch plate 20. Unlike the example illustrated in FIG. 8B, the example in FIG. 8B has a refracted or delayed elastic wave before being received at the grids 25 due to the presence of contaminant on the touch plate 20. As a result, unlike FIG. 8A, the vibration or elastic wave generated in response to touch is received first at the first grid ($P_{10}$) formed on the sensor bar at time ($t_{10}$), and then received at the second and third grids ($P_{20}$, $P_{30}$) adjacent to the first grid ($P_{10}$) at the same time ($t_{20}$). Next, the vibration is received at the fourth grid ($P_{40}$) adjacent to the second grid ($P_{20}$) at time ($t_{30}$), and then received at the fifth grid ($P_{50}$) adjacent to the third grid ($P_{30}$) at time ($t_{40}$).

If the vibration is received in the pattern explained above, i.e., if the second and third grids on the immediately-adjacent left and right sides to the first grid that received the vibration first sense the vibration at the same time ($t_{20}$), abnormality of the signal reception pattern may be determined based on whether or not the times ($t_{30}$, $t_{40}$) at which the fourth and fifth grids adjacent to the second and third grids sense the vibration match each other.

Alternatively, estimate time to receive the vibration at the grids ($P_{40}$, $P_{50}$) may be calculated, and compared with the actual time ($t_{30}$, $t_{40}$) to determine the presence or absence of abnormality in the signal reception pattern.

Referring to an example in FIG. 8B, due to the presence of contaminant near the fifth grid ($P_{50}$), the vibration moving toward the fifth grid ($P_{50}$) has refraction or delay. The refraction or delay of the vibration wave, when generated due to the presence of contaminant, causes discrepancy between the time at which the vibration is expected to be received at the fifth grid ($P_{50}$) and the time ($t_{40}$) at which the vibration is actually received. In this case, the noise determining unit 42 determines that the signal reception pattern contains abnormality due to presence of contaminant.

Hereinbelow, the process of determining at the noise determining unit 42 the presence or absence of abnormality in the signal reception pattern due to presence of contaminant, when elastic wave will be explained. Herein, the elastic wave is generated in response to touch inputted on a point on the touch plate 20 at a predetermined location on an orthogonal extended line of a middle location between the first and second grids ($P_{10}$, $P_{20}$), and received at the respective grids 25 of the touch sensor system.

Figure 9A:
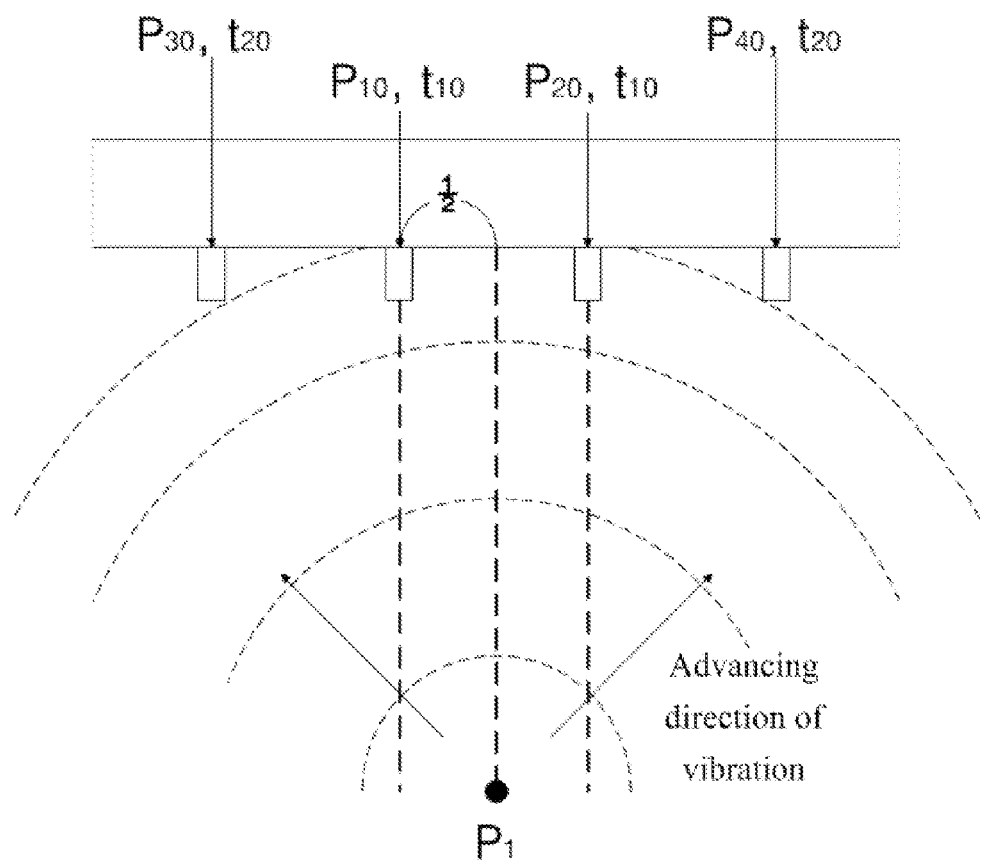
FIGS. 9A and 9B are views illustrating a process of determining absence/presence of reception pattern abnormality of a signal due to contaminant in a touch sensor system using vibration at a location of point, according to another embodiment.

FIG. 9A illustrates a process in which the elastic wave generated in response to touch is directly transferred to the grid 25 without having refraction or delay since there is no contaminant present on the touch plate 20. That is, the vibration or elastic wave, generated in response to touch, is received first at the first and second grids ($P_{10}$, $P_{20}$) at the same time ($t_{10}$), and received at the third and fourth grids ($P_{30}$, $P_{40}$), which are on the adjacent sides to the first and second grids ($P_{10}$, $P_{20}$), at the same time ($t_{20}$).

If the vibration is received in the pattern explained above, i.e., if the first and second grids receive the vibration at the same time ($t_{10}$), it is possible to determine the presence of abnormality in the signal reception pattern based on whether or not the third and fourth grids adjacent to the first and second grids receive the vibration at the same time ($t_{20}$).

Alternatively, it is possible to calculate the estimate time to receive the vibration at the respective grids ($P_{30}$, $P_{40}$), and compare the calculated estimate time with the time ($t_{20}$) at which the vibration is actually received at the respective grids 25 to determine the presence or absence of abnormality in the signal reception pattern based on whether or not the estimate time and the actual reception time match each other.

Referring to FIG. 9A, since there is no contaminant present on the touch plate 20, the calculated estimate time matches the time of actually receiving the vibration. Accordingly, it is determined that there is no abnormality in the signal reception pattern due to the presence of abnormality.

Figure 9B:
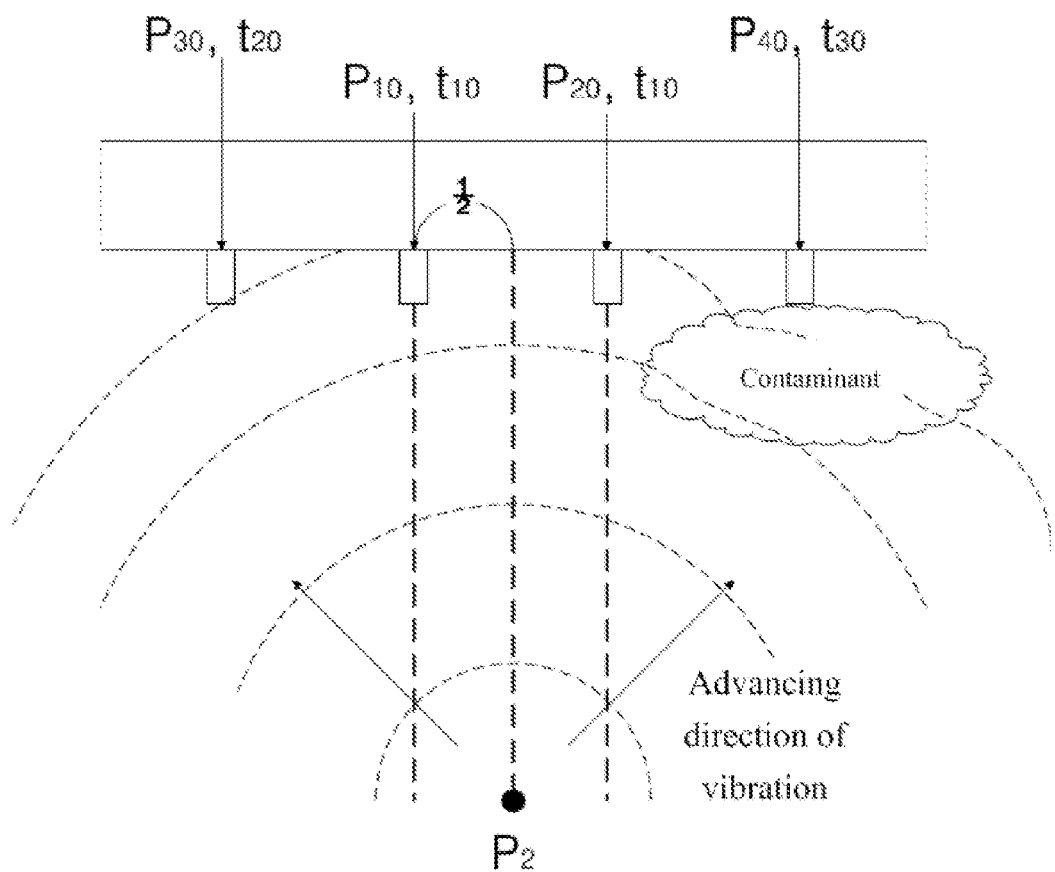

FIG. 9B illustrates a process in which the elastic wave generated in response to touch are refracted or delayed due to contaminant present on the touch plate 20. Because the elastic wave received toward the grids 25 is refracted or delayed due to presence of the contaminant present on the touch plate 20, unlike the process of FIG. 9A, the elastic wave generated in response to touch first arrives at the first and second grids ($P_{10}$, $P_{20}$) of the sensor bar at the same time ($t_{10}$), then arrives at the third grid ($P_{30}$) adjacent to $P_{10}$ at $t_{20}$ time, and arrives at the fourth grid ($P_{40}$) adjacent to $P_{20}$ at $t_{30}$ time.

If the vibration arrives according to the foregoing condition, in other words, if the first and the second grids adjacent to each other first receive the elastic wave at the same time ($t_{10}$), a signal reception pattern may be determined to be normal or not by finding whether the time ($t_{20}$, $t_{30}$) at which the third and fourth grids adjacent to the first and second grids match each other.

Alternatively, it is possible to calculate the estimate time to receive the vibration at $P_{30}$ and $P_{40}$, and compare the calculated estimate time with the actual time ($t_{20}$, $t_{30}$) at which the vibration is actually received at $P_{30}$ and $P_{40}$ to determine whether the reception pattern is normal or not.

Referring to FIG. 9B, because contaminant is present adjacent to $P_{40}$, a vibration wave moving toward $P_{40}$ may be refracted or delayed due to presence of the contaminant. The refracted or delayed vibration wave may cause discrepancy between the estimate time of $P_{40}$ to receive the vibration and the actual time ($t_{30}$) of receiving the vibration. Accordingly, the noise determining unit 42 may determine that the signal reception pattern has abnormality due to presence of the contaminant.

Figure 10A:
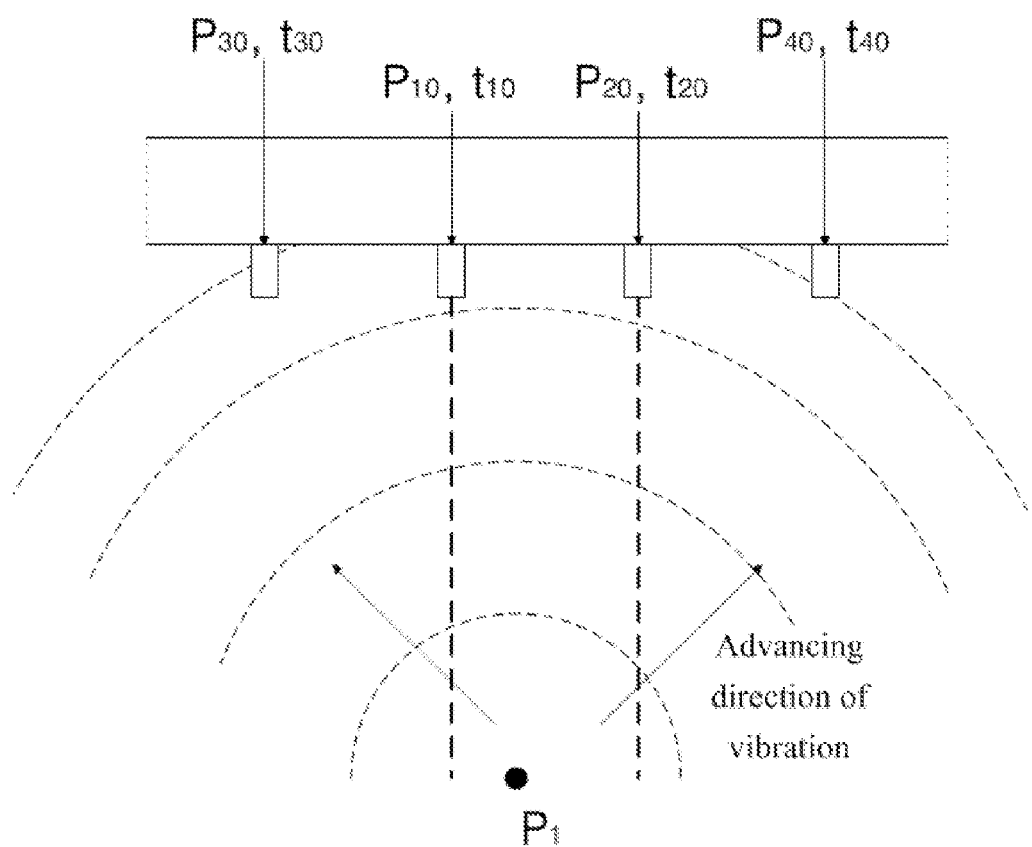
FIGS. 10A and 10B are views illustrating a process of determining absence/presence of reception pattern abnormality of a signal due to a contaminant in a touch sensor system using vibration at a location of point, according to another embodiment.
Figure 10B:
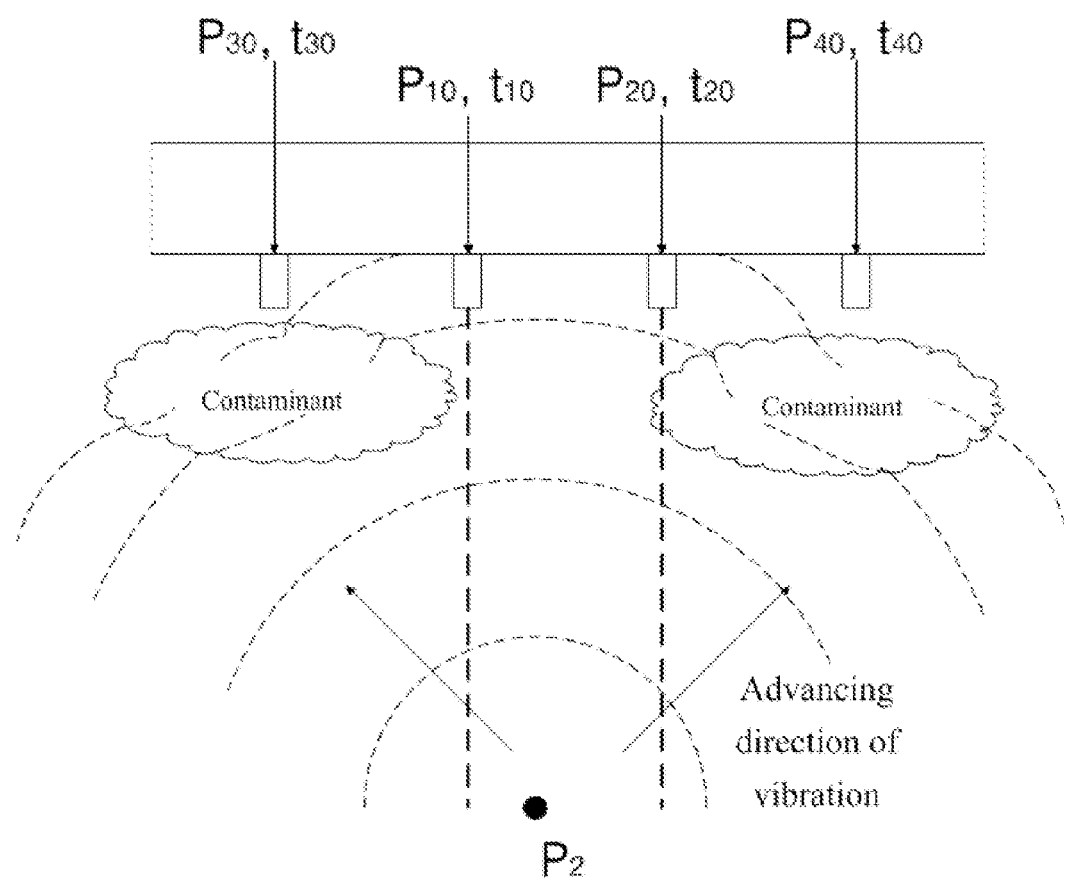

Referring to FIGS. 10A and 10B, another embodiment will be explained in detail below. That is, the noise determining unit 42 may determine whether the signal reception pattern has abnormality due to presence of the contaminant, when the grids 25 of the touch sensor system receive the elastic wave generated in response to touching on the touch plate 20 from the spot at the one fourth distance from $P_{10}$ toward $P_{20}$, in other words, from the spot somewhere on the orthogonal line extended from a middle space of $P_{10}$ and $P_{20}$ and the middle point of $P_{10}$.

FIG. 10A illustrates a process in which the elastic wave generated in response to touch is moving toward the grids 25 without refracted or delayed because there is no contaminant present on the touch plate 20. The vibration or elastic wave generated in response to touch may first arrive at the first grid ($P_{10}$) of the sensor bar at time ($t_{10}$), and arrive at the second grid ($P_{20}$) at time ($t_{20}$), and arrive at the third grid ($P_{30}$) at time ($t_{30}$), and arrive at the fourth grid ($P_{40}$) at time ($t_{40}$).

If the vibration arrives according to the foregoing condition, in other words, if the elastic wave is received at $P_{20}$ before $P_{30}$ at time ($t_{20}$), in which $P_{20}$ and $P_{30}$ are on immediately-adjacent sides to the first grid that received the vibration first (at $t_{10}$), the signal reception pattern may be determined to be normal or not based on $t_{30}$ at which the vibration is received at the third grid or $t_{40}$ at which the vibration is received at the fourth grid adjacent to the second grid. To be specific, the traveling distance of the elastic wave may be calculated by multiplying the velocity of propagation of the elastic wave by time. Since the traveling velocity of the vibration wave on the touch plate 20 is v(t) and the distance between the grids 20 is known, the estimate time of receiving the vibration at respective grids ($P_{30}$, $P_{40}$) may be calculated. The noise determining unit 42 may compare whether the estimate time matches the actual time ($t_{30}$, $t_{40}$) of receiving the vibration at the respective grids 25 or not, and determine the signal reception pattern to be normal or not based on the result of comparison.

Referring to FIG. 10A, no contaminant is present on the touch plate 20. Accordingly, since the calculated estimate time is identical to the actual time at which the vibration is received, it is determined that no abnormality is generated in the reception pattern of the signal due to the contaminant.

FIG. 10B illustrates a process in which the elastic way, generated in response to touch input, is refracted or delayed due to the presence of contaminant on the touch plate 20. Referring to FIG. 10B, the elastic wave received at the grids 25 is refracted or delayed due to the presence of contaminant on the touch plate 20. Accordingly, unlike the situation in FIG. 10A, the vibration or elastic wave generated in response to touch input is received first at $t_{10}$ at the first grid $P_{10}$ formed on the sensor bar, and then received at the second grid $P_{20}$ at $t_{20}$. After that, vibration wave, with the speed varied due to the presence of contaminant, is received at the third and fourth grids $P_{30}$, $P_{40}$ at $t_{30}$, $t_{40}$, respectively.

If the vibration is received in the pattern explained above, that is, if the second grid formed immediately adjacent to the first grid receives vibration at $t_{20}$ following the first grid which received vibration at $t_{10}$ before the third grid which is also formed immediately adjacent to the first grid, presence of abnormality in the signal reception pattern may be determined based on $t_{30}$ at which the vibration is received at the third grid or $t_{40}$ at which the vibration is received at the fourth grid formed adjacent to the second grid. That is, since the traveling distance of the elastic wave can be obtained by multiplying the propagating time of the elastic wave by time, and the propagating time on the touch plate 20 is v(t) and the distance between the respective grids is known, it is possible to calculate the estimate time at which the vibration is received at the respective grids $P_{30}$, $P_{40}$. The noise determining unit 42 may compare whether the calculated estimate time matches the actual time of receiving the vibration at the respective grids ($t_{30}$, $t_{40}$) or not and determine the presence of abnormality in the signal reception pattern based on the result of comparison. Referring to FIG. 10B, due to the contaminant present near $P_{30}$ and $P_{40}$, the vibration or elastic wave moving toward $P_{30}$ and $P_{40}$ may be refracted or delayed due to the presence of the contaminant. If the vibration wave is refracted or delayed due to the presence of contaminant, the estimate time to receive the vibration at $P_{30}$ and $P_{40}$ and the actual time ($t_{30}$, $t_{40}$) at which the vibration is actually received vary. In this case, the noise determining unit 42 may determine that the signal reception pattern has abnormality due to presence of contaminant.

If the contaminants cause the refraction or the delay of the vibration wave, the traveling velocity of the vibration wave may change. The velocity may decrease or increase. One skilled in the art will understand that the condition where the traveling velocity of the vibration wave increases due to the external wave is included in the scope of the features presented by the embodiment.

The noise determining unit 42 may determine whether the signal reception pattern of the respective grids 25 is normal or not according to the foregoing methods. The noise determining unit 42 may determine whether the signal reception pattern of the grids 25 is normal or not whenever the touch is inputted, or determine whether the signal pattern is normal or not upon user's request. One skilled in the art will understand that the noise determining unit 42 determining the signal reception pattern of the grids 25 may be implemented in another variant way within the scope of the embodiment.

Further, if the noise determining unit 42 determines the signal reception pattern to be abnormal, the noise determining unit 42 may request a push of new input signal by another touch, or may inform a push indicating that the pattern has abnormality. Alternatively, a correction process may be performed with respect to the input signal generated in response to touch.

The touch point calculating unit 40 may map the location information of the touch point inputted on the touch plate 20 based on the suitable location and the size on the displayed screen and generate the location of touch information converted based on the displayed screen, if the touch plate 20 has the location and the size different from those of the displayed screen in the touch sensor system using touch point vibration according to an embodiment. In one embodiment, the touch point calculating unit 40 may include a first touch point calculating unit 44 calculating the location of touch on the touch plate 20 based on the electric signal received from the signal processing unit 30 and a second touch point calculating unit 47 which converts the location of touch on the touch plate 20 calculated by the first touch point calculating unit 44 to a relative location based on the screen displayed on the touch plate 20.

The first touch point calculating unit 44 may extract the first electric signal received at the grids 25, set the location of the receiving grids 25 on X and Y coordinates, and calculate the location of the touch point. The coordinates set by the first touch point calculating unit 44 may be based on the touch plate 20 to calculate the location of the touch point P. Accordingly, it is necessary to convert the location of the touch point P to a relative location with respect to the displayed screen by the second touch point calculating unit 47.

Figure 11:
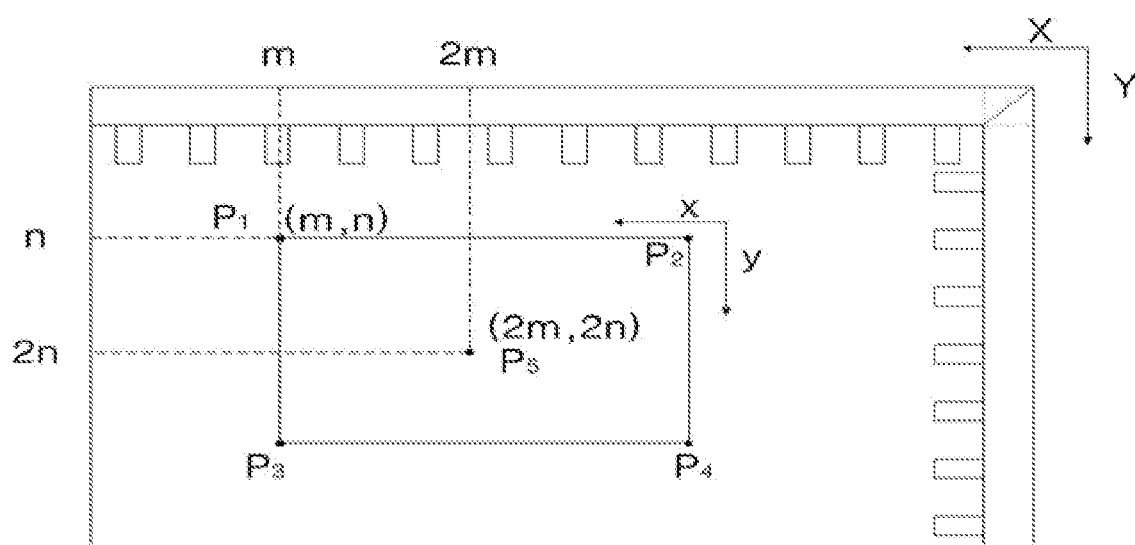
FIG. 11 is a view illustrating a process of converting location of point to corresponding location and size on a screen in a touch sensor system using vibration of touch, according to another embodiment.

Referring to FIG. 11, the process at the second touch point calculating unit 47 of the touch sensor system of converting the location information of the touch point based on the location and the size of the displayed screen on the touch plate 20 will be described in detail below.

FIG. 11 illustrates a process in which the second touch point calculating unit 47 converts the location information of the touch point based on the location and the size of the displayed screen on the touch plate 20 according to another embodiment. Referring to FIG. 11, for a screen requiring touch input which is displayed on a predetermined region of the touch plate 20 having $P_1$, $P_2$, $P_3$, $P_4$, if there is only the first touch point calculating unit 44 to calculate the location information of the touch point based on the whole touch plate 20, i.e., if there is no second touch point calculating unit 47 which converts the calculated location information of the touch point according to the location and size of the displayed screen on the touch plate 20, the location of the touch point on the displayed screen and the location of touch determined by the touch plate 20 may be different from each other. For instance, if the screen requiring touch input is displayed on a region of $P_1$, $P_2$, $P_3$, $P_4$, the location of $P_1$ may be (0, 0) based on the displayed screen. However, the touch sensor system without the second touch point calculating unit 47 may perceive the location of $P_1$ as (m, n). Accordingly, if a user touches $P_1$ to click point (0, 0) on the displayed screen, the touch sensor system missing the second touch point calculating unit 47 perceives the location information of the touch as point (m, n) based on the whole touch plate 20. Accordingly, the computing device generating the displayed screen may determine that the user touches $P_5$ at a distance of m along X-axis and at a distance of n along the Y-axis based on $P_1$.

Accordingly, the second touch point calculating unit 47 is necessary, which converts the location of the touch on the displayed screen calculated by the first touch point calculating unit 44 to the touch information based on the location and size of the displayed screen.

Referring to FIG. 11, for a displayed screen which is a square having vertexes $P_1$, $P_2$, $P_3$, and $P_4$, if the user touches $P_1$, a process is necessary to convert the location information (m, n) based on the touch plate 20 into the location information (0, 0) based on the displayed screen. To be specific, $P_1$ may have location information (m, n) based on the touch plate 20 and this has to be converted into location information (0, 0) based on the displayed screen. The above-mentioned converting process may process the input information suitable for the displayed screen. In one embodiment, if the screen requiring the touch input is displayed on a predetermined portion of the touch plate 20, the second touch point calculating unit 47 may map the location information of the touch made with respect to the touch plate 20 to a location on the displayed screen.

Further, according to an embodiment, for the touch plate 20 and the displayed screen which have different sizes from each other, if touch is inputted on a non-displayed screen, the second touch point calculating unit 47 may determine that the touch is not inputted. The touch sensor system may enable a user to intuitionally input in response to the displayed screen. Accordingly, if the input is made outside the displayed screen, the second touch point calculating unit 47 may determine that the input is not made to prevent inputting errors. The second touch point calculating unit 47 may inform ('push') the presence of the touch which is made outside the displayed screen.

The second touch point calculating unit 47 may require the location information of the displayed screen based on the touch plate 20 in converting the location information of the touch based on the location and the size of the displayed screen. In one embodiment, the touch sensor system may additionally include a screen determining unit 46 which manages the location and size information of the displayed screen. The screen determining unit 46 may receive the location and size information of the displayed screen from the user, may have preset information in the system, or may generate the information by sensing the relative location and the size of the displayed screen.

To be specific, if the screen determining unit 46 receives the location and size information of the displayed screen from the user, the screen determining unit 46 may receive at least two information including the location and size information of the displayed screen and calculate the location and the size of the displayed screen based on the received information. If the displayed screen is a square having x-line parallel to X of the touch plate 20 and y-line parallel to Y of the touch plate 20, the screen determining unit 46 only needs to receive the location information ($P_1$, $P_4$) to calculate the location information of $P_2$ and $P_3$, and calculate the relative location and size of the displayed screen.

In one embodiment, the screen determining unit 46 may receive at least three location information to calculate the relative location and size of the displayed screen. For instance, if the location information of $P_1$, $P_2$, and $P_4$ are inputted, the screen determining unit 46 may calculate the location of $P_3$ with $P_1$, $P_2$, and $P_4$, and calculate the location and the size of the displayed screen. One skilled in the art will understand that, if the displayed screen is a polygon, the screen determining unit 46 may calculate the location and the size of the displayed screen based on the received location information.

The location and size information of the displayed screen may be previously set and stored in the system. If the location and the size of the screen displayed on the touch plate 20 have patterns, the location and size information may be or may have been stored in the system.

According to an embodiment, the size information may be stored based on a predetermined point on the touch plate 20, and may set so that the displayed screen is displayed on a corresponding location according to the size of the displayed screen. When the second touch point determining unit 47 converts the location of touch information based on the displayed screen from the location of touch information on the touch plate 20 calculated by the first touch point determining unit 44, the location of touch is converted based on the relative location with respect to the screen by using the stored information in the system.

If the location and size information of the displayed screen is preset in the system, the touch sensor system according to an embodiment may display the predetermined location and size information of the screen set on the touch plate 20, which will be described in detail below referring to FIG. 12.

Figure 12A:
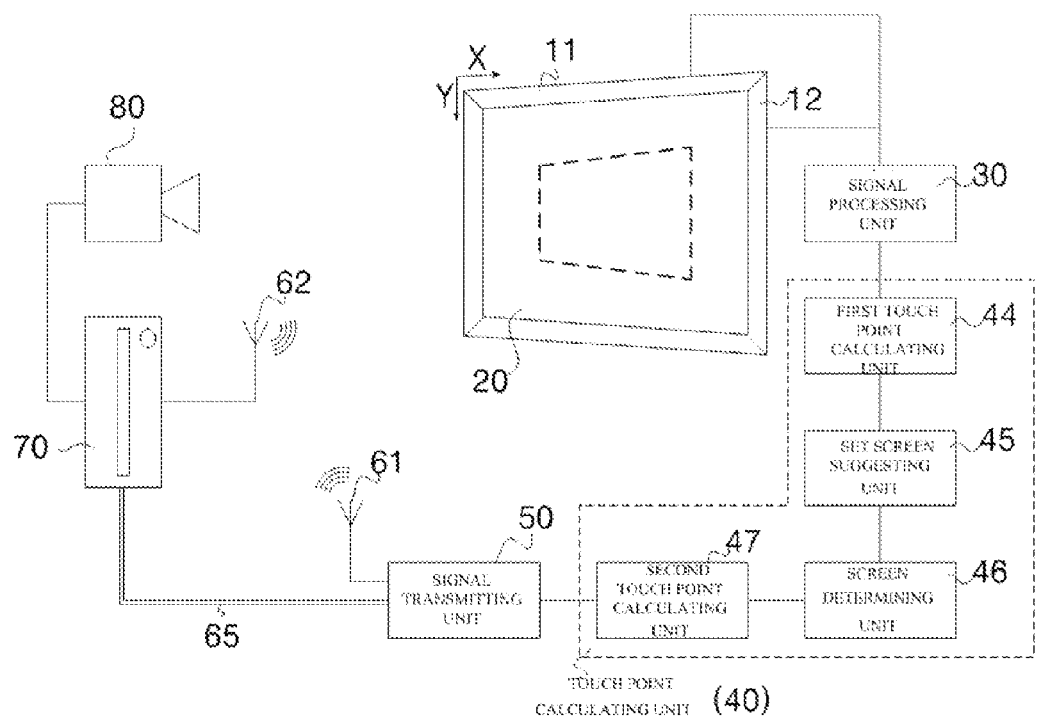
FIGS. 12A and 12B are views illustrating an example of a touch sensor system using vibration at a location of touch, according to another embodiment.
Figure 12B:
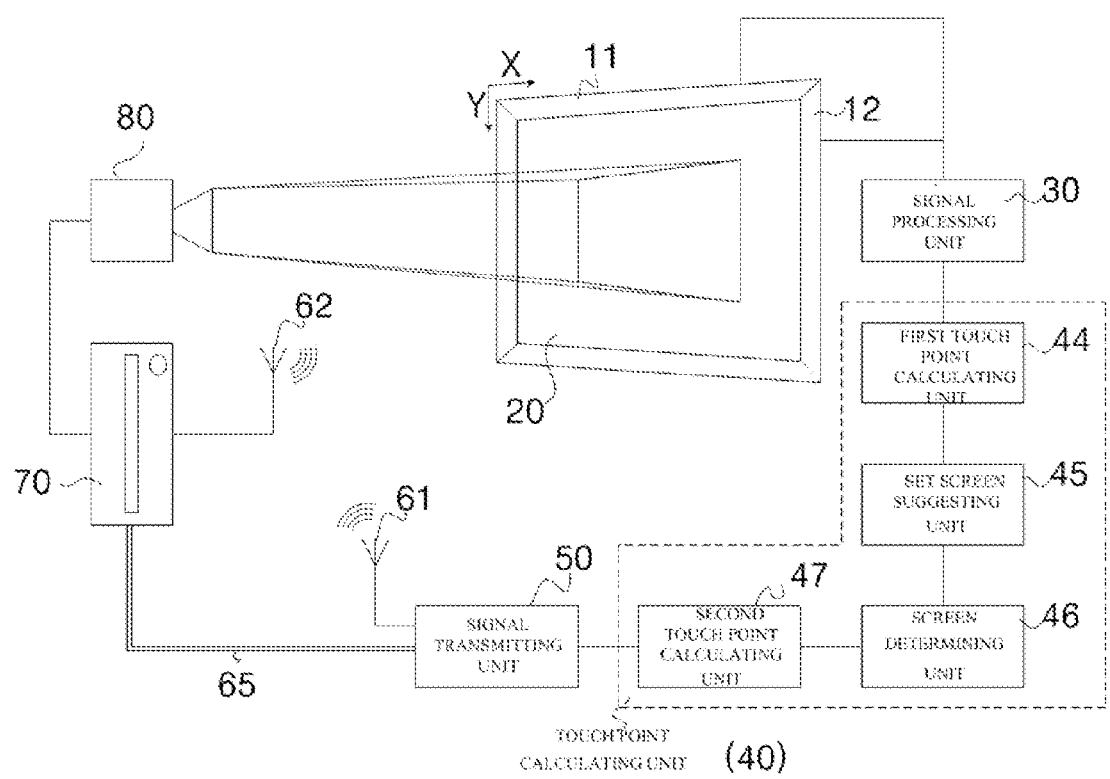

FIGS. 12A and 12B illustrate a touch sensor system using touch point vibration according to another embodiment. Referring to FIGS. 12A and 12B, the touch sensor system using touch point vibration may receive the touch to the displayed screen on the touch plate 20 projected from a projector 80, and provide an external computing device 70 with the touch point information.

Referring to FIG. 12A, an embodiment may include a touch plate 20 having a first sensor bar 11 and a second sensor bar 12 respectively to transversal (X) and longitudinal (Y) side surfaces, in which the first and second sensor bars 11, 12 each has a piezoelectric grid formed on one side thereof; a signal processing unit 30 connected to the first and second sensor bars 11, 12 to receive an electric signal; a touch point calculating unit 40 which calculates a location of touch with respect to the touch plate 20 based on the electric signal received at the signal processing unit 30; a touch point calculating unit which calculates relative touch location with respect to displayed screen using the electric signal received from the signal processing unit 30 and the location and size information about the displayed screen; the computing device 70 which receives the calculated location information of the touch point by the wireless communication 62 or via the wire 65; and a projector 80 which projects on the touch plate a screen for receiving the specific location-based job generated at the computing device 70.

The touch point calculating unit 40 may include: a first touch point calculating unit 44 which calculates the location of touch on the touch plate 20; a set screen suggesting unit 45 which displays the location and size information of the screen set on the touch plate 20, based on the location and size information of the set displayed screen; a screen determining unit 46 which determines whether the location and the size of the screen displayed on the touch plate 20 correspond to the location and the size of the screen displayed by the set screen suggesting unit 45 by using an optical sensor sensing the light from the displayed screen; and a second touch point calculating unit 47 which converts the location of touch of the touch plate 20 calculated by the first touch point calculating unit 44 according to the relative location with respect to the displayed screen.

Referring to FIG. 12A, when the screen received from the computing device 70 is displayed on the touch plate 20 by using the projector 80, the set screen suggesting unit 45 of the touch point calculating unit 40 may display the screen received from the computing device 70 on the touch plate 20 by using the location and size information of the set screen.

To be specific, in one embodiment, when the screen requiring the touch input is received from the projector 80 using the computing device 70, the projector 80 may display the screen on the touch plate 20. The displayed screen displayed by the projector 80 may be smaller than the size of the touch plate 20 (see FIG. 12A).

Because the location and the size of the displayed screen and the location and the size of the touch plate 20 are different from each other, the location information of the touch on the touch plate 20 calculated by the first touch point calculating unit 44 may be converted to suit the location and size of the screen by the second touch point calculating unit 48.

Referring to 12A, the set screen suggesting unit 45 may display the location and size information of the displayed screen on the touch plate 20. To be specific, when the screen is displayed on the touch plate 20 using the projector 80, guide information regarding the location and the size of the displayed screen stored in the system may be displayed on the touch plate 20. The guide information may indicate the area having the location and the size on the touch plate 20 as shown in dotted lines in FIG. 12A. The guide information may be printed on the touch plate 40 if necessary, or may be displayed separately. One skilled in the art will understand that the foregoing display method may be applied variously within the scope.

In one embodiment, the touch sensor system using touch point vibration may include the screen determining unit 46 which determines whether the screen is displayed according to the location and size information of the displayed screen displayed by the set screen suggesting unit 45. The screen determining unit 46 may determine whether the screen is displayed according to the preset location and size information of the displayed screen displayed by the set screen suggesting unit 45 by using the optical sensor sensing the light from the screen. Through the screen determining unit 46, it is possible to determine if the screen from the projector 80 is displayed according to the location and size of the preset screen. If the screen is not displayed according to the location and size information of the preset screen, the screen determining unit 46 may inform ('push') the user with messaging methods.

The screen determining unit 46 may also sense the size and the relative location of the displayed screen on the touch plate 20 and generate the location and size information of the screen.

Unlike the examples illustrated in FIG. 12A, the set screen suggesting unit 45 in FIG. 12B may not display the location and size information of the screen to be displayed on the touch plate 20. If the screen received from the computing device 70 is displayed on the touch plate 20 using the projector 80, the screen determining unit 46 may sense the size and the location of the screen displayed on the touch plate 20, and generate the location and size information of the screen.

To generate the location and size information of the screen, the screen determining unit 46 may sense the light of the display by using the optical sensor to determine the size and the location of the screen. The optical sensor may be coupled to a front or rear surface of the touch plate 20, or may be separately attached.

If the touch is inputted at P on the displayed screen on the touch plate 20, the first sensor bar 11, the second sensor bar 12, the signal processing unit 30, and the touch point calculating unit 40 calculate the location information of P.

The location information of P may be transmitted to the computing device 70 through the signal transmitting unit 50. If the signal transmitting unit 50 and the computing device 70 each includes wireless communication devices 61 and 62 and are connected to each other wirelessly, the location information of P may be transmitted wirelessly. If both are connected to each other by wire 65, the location information of P may be transmitted by wire 65.

Figure 13:
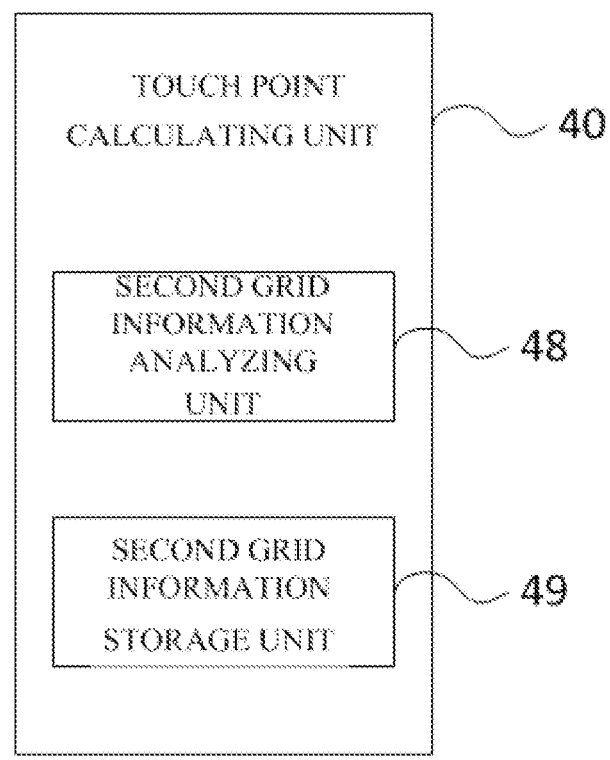
FIG. 13 is a schematic, block diagram illustrating in detail a touch location calculating unit, according to another embodiment.

FIG. 13 illustrates a block diagram of a touch point calculating unit according to an embodiment. Referring to FIG. 13, the touch point calculating unit 40 may include a second grid information storage unit 49 which stores the information of at least two grids receiving the vibration and a second grid information analyzing unit 48 which calculates the touch point location based on the information stored in the grid information storage unit.

The second grid information storage unit 49 may store information of the grids receiving the vibration generated in response to touch. Referring to FIG. 14, the grid information storage unit 42 according to an embodiment will be described in detail. FIG. 14 illustrates the information set stored in the second grid information storage unit 49 according to an embodiment. To be specific, referring to FIG. 14, the information set may include grid identification information of the piezoelectric material grids receiving the vibration such as $P_{10}$, $P_{20}$, $P_{30}$, $P_{40}$, $P_{50}$ ... $P_{01}$, $P_{02}$, $P_{03}$, $P_{04}$, $P_{05}$ and time information at which the grids sense the vibration such as $t_{10}$, $t_{20}$, $t_{30}$, $t_{40}$, $t_{50}$ ... $t_{01}$, $t_{02}$, $t_{03}$, $t_{04}$, $t_{05}$.

Because the touch sensor system according to an embodiment finds the touch point location based on the locations of the grids receiving the touch point vibration, the grids formed on one side of the first sensor bar 11 and the second sensor bar 12 may have distinguishing identification numbers. The detailed system for giving identification numbers may be appropriately determined by the choice of one skilled in the art. The identification numbers may preferably distinguish the grids formed on the first sensor bar 11 from the grids formed on the second sensor bar 12.

Considering that the first sensor bar 11 and the second sensor bar 12 including the grids are formed on the transversal X and the longitudinal Y side lines of the touch plate 20, the second grid information storage unit 49 may distinctively store the grid identification information with respect to each of the transversal (X) and longitudinal (Y) side lines and the time information of sensing the vibrations of each grid, Referring to FIG. 14.

Referring to FIG. 14, the vibration generated in response to touch first arrives at the grid $P_{10}$ formed on the first sensor bar 11 in transversal X direction, and the time when the grid $P_{10}$ receives the vibration is $t_{10}$. Next, the grid $P_{20}$ receives the vibration at $t_{20}$, and then the grid $P_{30}$ receives the vibration at $t_{30}$. Further, the vibration generated in response to touch first arrives at the grid $P_{01}$ formed on the second sensor bar 12 on the longitudinal Y direction of the second sensor bar 12, and the time when the grid $P_{01}$ receives the vibration is $t_{01}$. Next, the grid $P_{02}$ receives the vibration at $t_{02}$, and then the grid $P_{03}$ receives the vibration at $t_{03}$.

The second grid information analyzing unit 48 may establish coordinates (X, Y) of the touch point P based on the grids 25 with the location and time information that each grid 25 receives the vibration, and may calculate the touch point location. In one embodiment, the second grid information analyzing unit 48 may calculate the touch point location by using the locations of the grid first receiving the vibration and grids adjacent to the grid first receiving the vibration, time when the grid receives the vibration, and traveling velocity of the vibration in the medium of the touch plate 20. Accordingly, the velocity of the vibration transmitting in the medium of the touch plate 20 and the relative time information about time when each grid receives the vibration indicate the traveling distance of the vibration, and with the traveling distance, the touch point location along the transversal X and the longitudinal Y directions may be calculated.

Figure 15A:
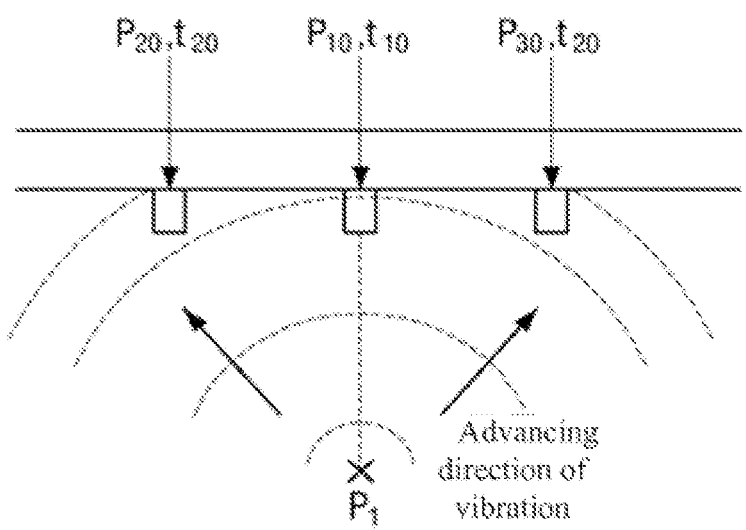
FIGS. 15A, 15B and 15C are views illustrating a process of calculating a location of touch in a touch sensor system using vibration at a location of touch, according to another embodiment.
Figure 15B:
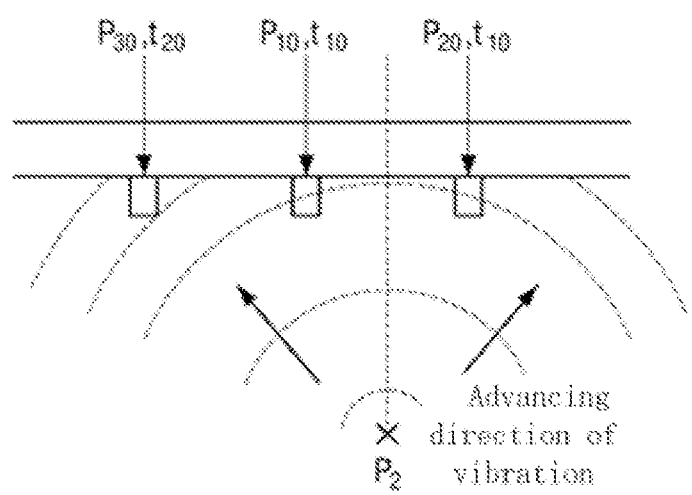
Figure 15C:
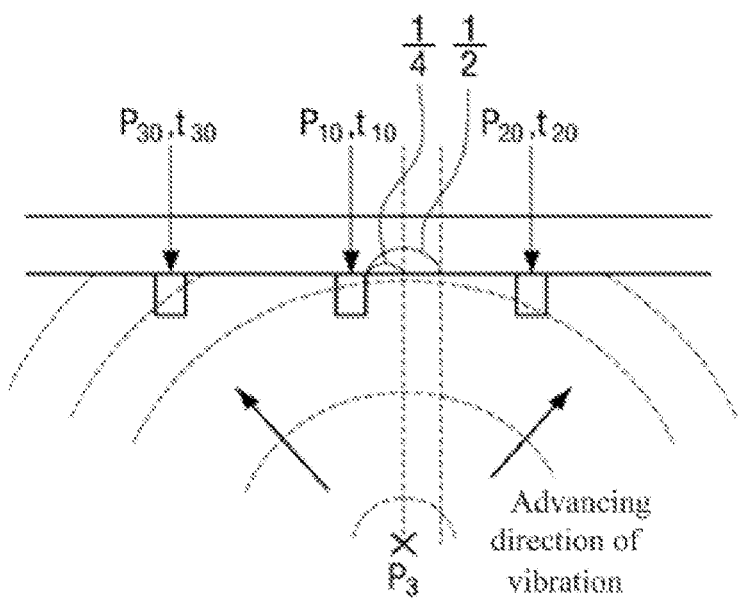

Referring to FIGS. 15A, 15B and 15C, a process of calculating the touch point location at the grid information analyzing unit 41 of the touch sensor system according to another embodiment will be described in detail below.

Referring to FIG. 15A, if the touch is inputted at $P_1$ on the touch plate 20 from the orthogonal extended line of the first grid $P_{10}$, the vibration or elastic wave generated in response first arrives the first grid $P_{10}$ formed on the sensor bar at $t_{10}$, and the second grid $P_{20}$ and the third grid $P_{30}$ simultaneously receive the vibration at $t_{20}$. If the vibration is received according to the foregoing pattern, it may be determined that the touch is inputted from a location on the orthogonal extended line of the first grid $P_{10}$. Accordingly, the second grid information analyzing unit 48 may calculate the vibration location based on the first grid $P_{10}$ receiving the vibration or elastic wave.

Referring to FIG. 15B, if the touch is inputted at $P_2$ on the touch plate 20 from the orthogonal extended line in the middle of the first grid $P_{10}$ and the second grid $P_{20}$, the vibration or elastic wave first arrives at the first grid $P_{10}$ and the second grid $P_{20}$ formed on the sensor bar at $t_{10}$, and the third grid $P_{30}$ on adjacent left and right sides to $P_{10}$ and $P_{20}$ receives the vibration at $t_{20}$. Accordingly, if the vibration is received according to the foregoing pattern, it may be determined that the touch is inputted from a location on the orthogonal extended line of the middle between the first grid $P_{10}$ and the second grid $P_{20}$. The second grid information analyzing unit 48 may calculate the vibration location based on the middle location between the first grid $P_{10}$ and the second grid $P_{20}$ which first receives the vibration or elastic wave.

Referring to FIG. 15C, if the touch is inputted at $P_3$, which is at one-fourths distance from the first grid $P_{10}$ toward the second grid $P_{20}$, i.e., from the orthogonal extended line between the middle of the first grid $P_{10}$ and the second grid $P_{20}$ and the middle of the first grid $P_{10}$, the vibration or elastic wave first arrives at the first grid $P_{10}$ formed on the sensor bar at $t_{10}$, and the second grid $P_{20}$ then receives the vibration at $t_{20}$, and the third grid $P_{30}$ receives the vibration at $t_{30}$. Accordingly, if the vibration is received according to the foregoing pattern, it may be determined that the touch is inputted from a location on the orthogonal extended line at one-fourth distance from the first grid $P_{10}$ toward the second grid $P_{20}$. Accordingly, the second grid information analyzing unit 48 may calculate the vibration location based on the location at one-fourths distance from the first grid $P_{10}$ first receiving the vibration or elastic wave toward the second grid $P_{20}$ which receives the vibration next to $P_{10}$.

The touch point calculating unit 40 according to an embodiment may include a calculating unit such as a Micro Controller Unit (MCU) and a controller card to calculate the location. The controller card may convert the digital signal of the grids 25 processed by the signal processing unit 30 to the matrix on the touch plate 20 to designate the accurate location. With the controller card, coordinates (x, y) of the received signal from the grids 25 may be processed, and the touch point location may be calculated.

The signal transmitting unit 50 may transmit location information of the touch point processed by the touch point processing unit 40 to external devices. If the external devices and the signal transmitting unit 50 are connected by wire, the location information may be transmitted in a wired manner. Further, if the external devices and the signal transmitting unit 50 are connected wirelessly, the location information may be transmitted wirelessly. Any communication methods can be applied in the invention. The Bluetooth may be implemented to directly connect the communication, or WiFi may be implemented to connect the communication indirectly. Other communication methods such as Zigbee, WLAN, and HomeRF may also be applied.

Figure 16:
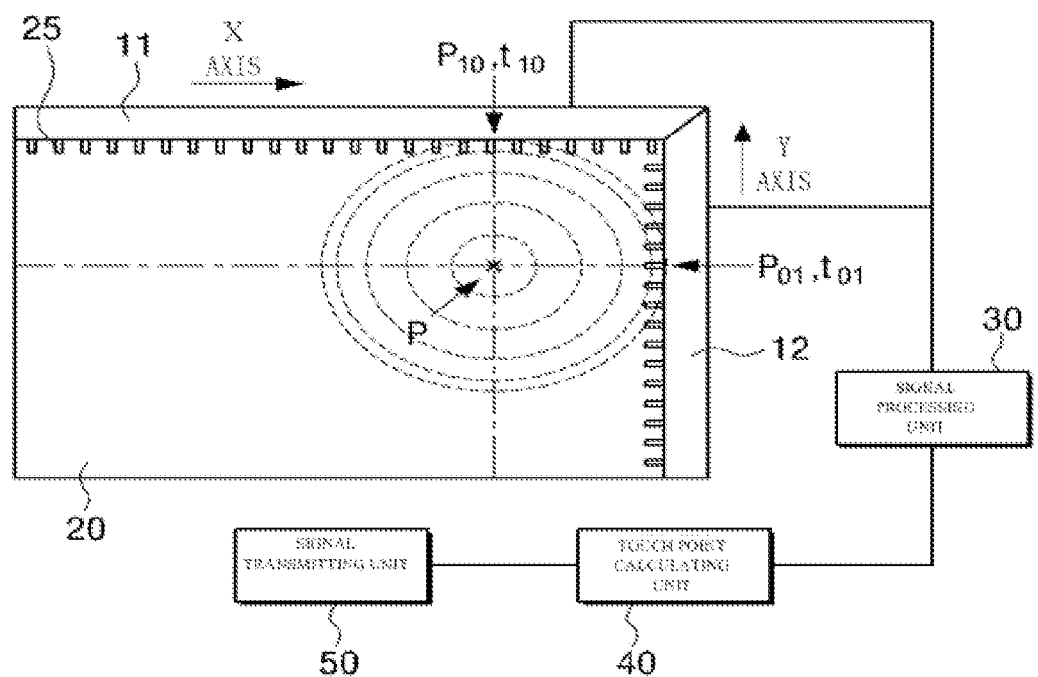
FIG. 16 is a view illustrating a process of calculating a location of touch in a touch sensor system using vibration at a location of touch, according to another embodiment.

FIG. 16 illustrates a process of calculating the touch point location in the touch sensor system using touch point vibration, according to another embodiment.

If the touch is inputted at one point on the touch plate 20, the vibration or elastic wave is generated. The elastic wave propagates in all directions in the medium of the touch plate 20, and arrives at the grids 25 formed on the first sensor bar 11 and the second sensor bar 12. The elastic wave generated from the touch point arrives at the grids 25, and the grids 25, made from the piezoelectric material, may have pressure or stress generated in response to the elastic wave to thus generate electric signal.

The signal processing unit 30 may receive the electric signals generated from the grids 25 and convert to the digital signals. The touch point calculating unit 40 may analyze the digital signals and calculate the touch point location. In one embodiment, the touch point calculating unit 40 may calculate the location of the grid 25 which first receives the elastic wave. If the location of the grid 25 is calculated, the intersecting point is extracted from the extended line from the grid 25 processed on the touch plate matrix and the touch point location may be calculated based on the intersecting point.

As used herein, the 'elastic wave' refers to all types of elastic wave including longitudinal and transversal waves that need medium, since the elastic wave conveys energy due to change in disturbance status in an elastic medium. An example of elastic wave includes sound wave which mainly uses air as medium, water wave which uses water as a medium, or seismic wave which uses interior substance of Earth. The elastic wave is frequently called dynamic wave, since the wave energy exists in the form of kinetic energy and potential energy. On the contrary, electromagnetic wave is non-elastic wave since this is transmitted without requiring a medium.

The elastic wave is transmitted in the same form as the vibration wave in the medium like touch plate 20. When a user touches the touch plate 20, the elastic wave starts propagating from the location of touch. The elastic wave first reaches the grid 25 in the shortest distance from the location of touch, and this point corresponds to the touch point grid spot to calculate the location of touch.

Each grid 25 at the location of touch absorbs elastic wave or vibration wave, and since the grid 25 is made from piezoelectric material, distortional stress of the grid 25 due to wave energy is applied, and as a result, the piezoelectric grid 25 generates an electric signal. Gaps between the grids 25 may preferably be formed in nano-scale to enable accurate determination of the location of touch, and increase sensitivity to vibration.

The piezoelectric material has induced polarization in response to an external mechanical pressure applied thereto or mechanical deformation due to external electromagnetic field. Crystal used in electric watch is the representative example thereof. If weak electricity is applied to the crystal, vibration occurs with frequency corresponding to the orientation or size of the crystal, in which the number of vibrations is calculated for use in watches.

PZT is the most widely used piezoelectric material, and has the constitution of $Pb(Zr, Ti)O^3$. The piezoelectric material is used in various applications including gas range ignition, ultrasound oscillator (for use in humidifier, ultrasound detector, nondestructive inspection), or piezoelectric transformer. The recent development has enabled very precise displacement, and various researches have been actively conducted to find the ways of using piezoelectricity in the field of actuator including atomic force microscopy (AFM), ultrasound motor, or the like.

As explained above, the piezoelectric grids 25 are subject to mechanical pressure or stress due to elastic wave applied in response to touch, and as a result, polarization is induced and electric signal is generated. The electric signal is electrically connected to the signal processing unit 30 by the grids 25 and wires.

The signal processing unit 30 converts the analog signal received at the respective grids 25 into digital signal, and divides the received signals at each point on the grid 25 along the extracted transversal and longitudinal axes by time or order of reception.

The touch point calculating unit 40 extracts the electric signal which is first received electric signal at each point on the grid 25, sets X and Y coordinates of the touch point (P) based on the point on the grid 25 where the electric signal is received, and calculates the location of the touch point.

The signal transmitting unit 50 transmits location information of the touch point calculated at the touch point calculating unit 40 to outside. As used herein, the 'outside' refers to an external computing device which needs the location information of the touch point.

Figure 17:
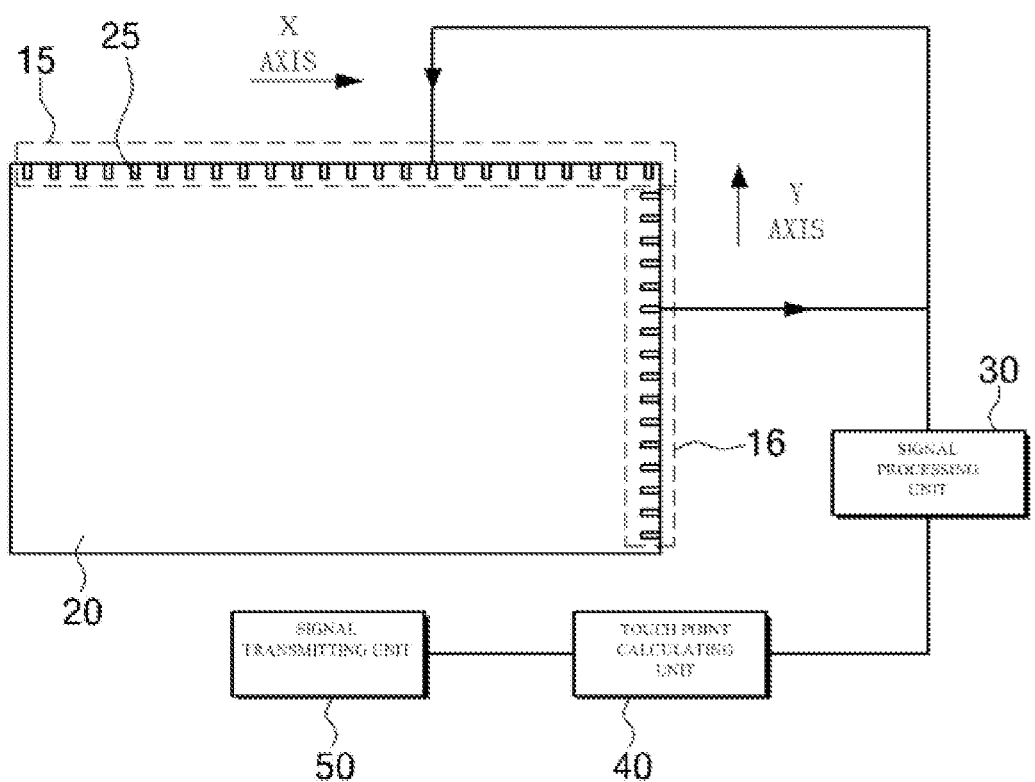
FIG. 17 is a schematic, block diagram of a touch sensor system using vibration at a location of touch, according to another embodiment.

FIG. 17 illustrates a schematic, block diagram of a touch sensor system using touch point vibration according to another embodiment, in which the grids made from the piezoelectric material formed on the transversal X and the longitudinal Y side surfaces of the touch plate 20, rather than formed on one side surface of the bar, to construct the first sensor unit 15 and the second sensor unit 16.

The foregoing constitution of the touch sensor system may reduce the unit price of the touch sensor system, simplify the structure and enhance the integration. In one embodiment, an additional cover may be provided to protect the sensor units 15 and 16.

Figure 18:
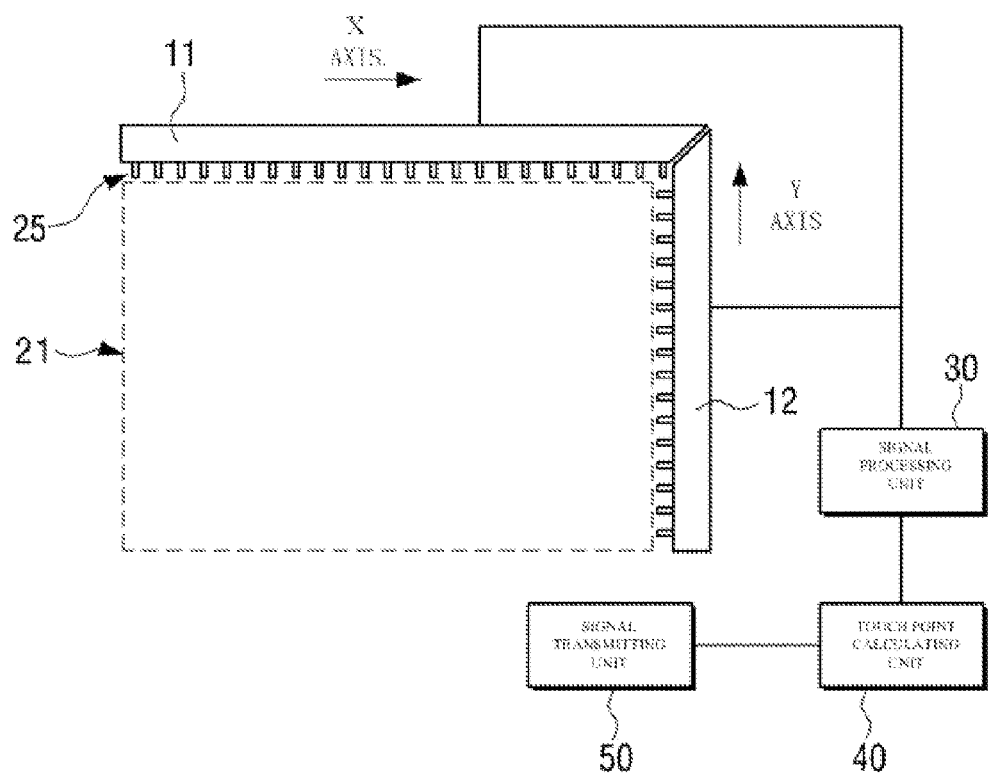
FIG. 18 is a schematic, block diagram of a touch sensor system using vibration at a location of touch, according to another embodiment.

FIG. 18 illustrates a schematic, block diagram of a touch sensor system using touch point vibration according to an embodiment. Referring to FIG. 18, the touch sensor system using touch point vibration may include: a first sensor bar 11 having a piezoelectric grid formed on a side surface thereof; a second sensor bar 12 having a piezoelectric grid formed on a side surface thereof and in which one end is connected to an end of the first sensor bar 11 in an orthogonal direction; a signal processing unit 30 connected to the first and second sensor bars to receive an electric signal; a touch point calculating unit 40 which extracts the received signal from the signal processing unit 30 to calculate a location of touch point; and a signal transmitting unit 50 which transmits the location information of the touch point calculated at the touch point calculating unit 40 to outside.

The first sensor bar 11 having the piezoelectric grid formed on one side surface corresponds to the transversal X side line of the screen 21 provided for touch input, and the second sensor bar 12 having the piezoelectric grid formed on one side surface corresponds to the longitudinal Y side line of the screen 21 provided for touch input. Further, an end of the first sensor bar 11 and an end of the second sensor bar 12 are connected to each other orthogonally. The first sensor bar 11 and the second bar 12 may be positioned according to the screen 21 provided for touch input, or alternatively, the screen provided for touch input may be displayed according to a region defined by the first sensor bar 11 and the second sensor bar 12.

In one embodiment, the first and second sensor bars 11, 12 may be provided in the form of elongated bars lengthwise along the side lines to be coupled with the transversal X or longitudinal Y side lines of the screen 21 provided for touch input, and may be provided in polyhedron shapes with rectangular or triangular cross-sections, or spherical shapes with circular or oval cross-sections.

Figure 19A:
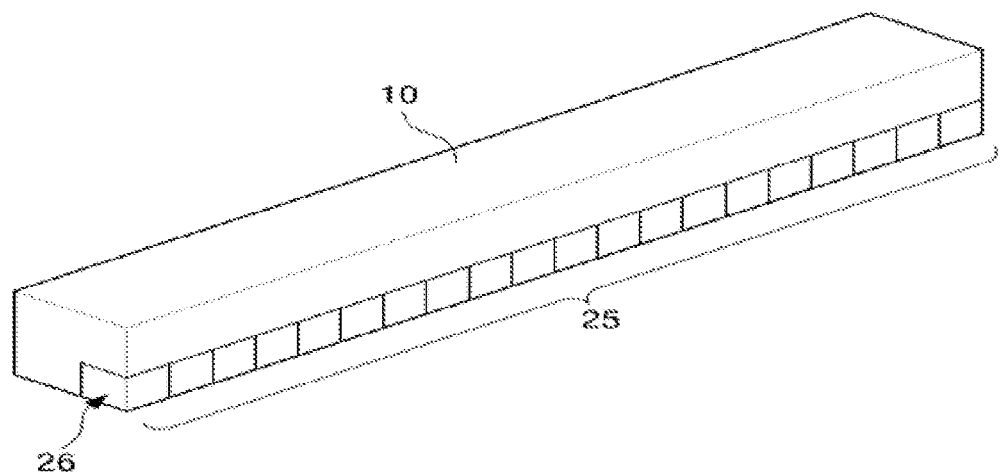
FIGS. 19A and 19B are views illustrating a sensor bar for use in a touch sensor system using vibration at a location of touch, according to another embodiment.
Figure 19B:
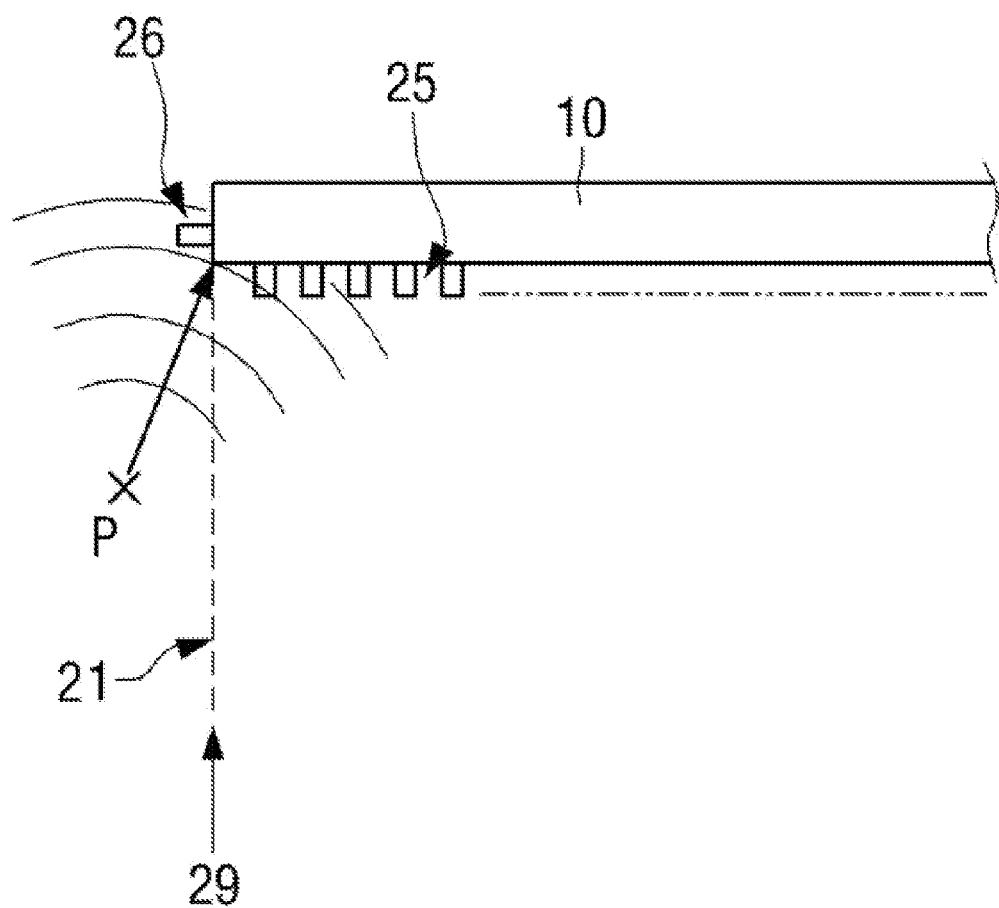

FIGS. 19A and 19B illustrate the structure of a sensor bar 10 used as the first sensor bar 11 and the second sensor bar 12 according to another embodiment. Referring to FIG. 19A, piezoelectric grids 25 may be formed on one side of the sensor bar 10.

In one embodiment, the screen 21 provided for touch input may require a user input based on touch and may be generated by various computing devices. The screen 21 may be displayed on the medium delivering the vibrations by the user touch efficiently. For instance, the screen may be displayed by the projector on a medium such as glass, plastic, or wooden plate, or may be displayed on a display to which a touch input device is not separately added.

If the touch is inputted at one point on the screen to which touch is currently inputted, the vibration or elastic wave is generated from that point ('touch point'). The elastic wave propagates in all directions in the medium of the surface on which the screen 21 is displayed, and arrives at the grids 25 formed on the sensor bar 10. The elastic wave generated from the touch point arrives at the grids 25, and the grids 25, made from the piezoelectric material, may have pressure or stress generated in response to the elastic wave to thus generate electric signal.

As used herein, the 'elastic wave' refers to all types of elastic wave including longitudinal and transversal waves that need medium, since the elastic wave conveys energy due to change in disturbance status in an elastic medium. An example of elastic wave includes sound wave which mainly uses air as medium, water wave which uses water as a medium, or seismic wave which uses interior substance of Earth. The elastic wave is frequently called dynamic wave, since the wave energy exists in the form of kinetic energy and potential energy. On the contrary, electromagnetic wave is non-elastic wave since this is transmitted without requiring a medium.

The elastic wave is transmitted in the same form as the vibration wave in the medium like the screen 21 provided for touch input. When a user touches the screen 21 provided for touch input, the elastic wave starts propagating from the location of touch. The elastic wave first reaches the grid 25 in the shortest distance from the location of touch, and this point corresponds to the touch point grid spot to calculate the location of touch.

Each grid 25 at the location of touch absorbs elastic wave or vibration wave, and since the grid 25 is made from piezoelectric material, distortional stress of the grid 25 due to wave energy is applied, and as a result, the piezoelectric grid 25 generates an electric signal. Gaps between the grids 25 may preferably be formed in nano-scale to enable accurate determination of the location of touch, and increase sensitivity to vibration.

The piezoelectric material has induced polarization in response to an external mechanical pressure applied thereto or mechanical deformation due to external electromagnetic field. Crystal used in electric watch is the representative example thereof. If weak electricity is applied to the crystal, vibration occurs with frequency corresponding to the orientation or size of the crystal, in which the number of vibrations is calculated for use in watches.

PZT is the most widely used piezoelectric material, and has the constitution of $Pb(Zr, Ti)O^3$. The piezoelectric material is used in various applications including gas range ignition, ultrasound oscillator (for use in humidifier, ultrasound detector, nondestructive inspection), or piezoelectric transformer. The recent development has enabled very precise displacement, and various researches have been actively conducted to find the ways of using piezoelectricity in the field of actuator including atomic force microscopy (AFM), ultrasound motor, or the like.

As explained above, the piezoelectric grids 25 are subject to mechanical pressure or stress due to elastic wave applied in response to touch, and as a result, polarization is induced and electric signal is generated. The electric signal is electrically connected to the signal processing unit 30 by the grids 25 and wires.

In one embodiment, the touch sensor system may additionally include a boundary detecting unit 26 formed on an end of one side of the sensor bar 10 to perceive a touch made outside a boundary line of an end of each of the first and second bars. Referring to FIG. 19B, the boundary detecting unit may perceive a touch (P) made to an area beyond the end of the sensor bar 10, and made from the same material as he grids 25.

The screen requiring the touch according to an embodiment may be located inside of the boundary. Referring to FIG. 19B, if the touch is inputted outside of the boundary, the boundary detecting unit 26 receives the vibration by the touch, thus perceiving that the touch is out of the boundary.

Further, according to an embodiment, if the first sensor bar 11 and the second sensor bar 12 are coupled with the side line of the screen 21 provided for touch input, an end of the first sensor bar 11 and an end of the second sensor bar 12 may be structurally coupled with each other. Such coupling may be separable, or integrated which does not allow separation depending on choice by one skilled in the art. If the coupling is not separable, in the screen 21 provided for touch input, a portion corresponding to the transversal X side surface corresponds to the first sensor bar 11 and a portion corresponding to the longitudinal Y side surface corresponds to the second sensor bar 12.

Figure 20:
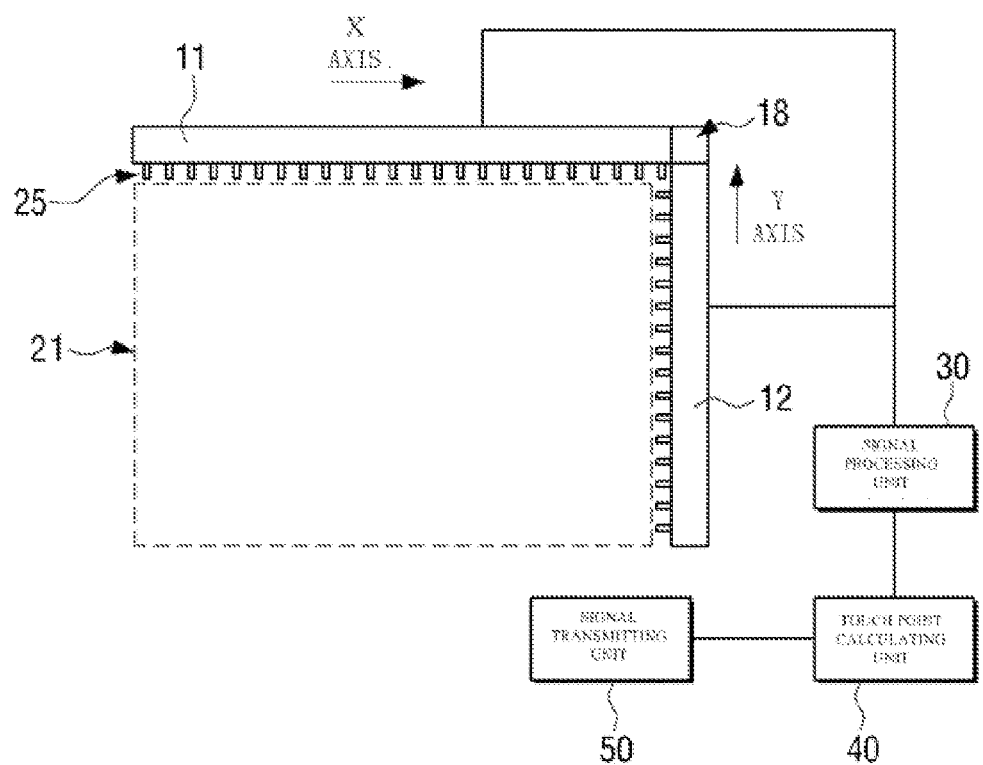
FIG. 20 is a view illustrating a touch sensor system using vibration at a location of touch including a bar fixing unit, according to another embodiment.

FIG. 20 illustrates a schematic, block diagram of a touch sensor system using touch point vibration according to another embodiment, which includes a bar fixing unit 18 for coupling the first and the second sensor bars 11 and 12 orthogonally. The bar fixing unit 18 may be coupled to the ends of the sensor bars 11 and 12 so that the first and the second sensor bars 11 and 12 are located to correspond to the transversal X and longitudinal Y side lines of the screen.

In one embodiment, the screen 21 provided for touch input may require a user input based on touch and may be generated by various computing devices. The screen 21 may be displayed on the medium delivering the vibrations by the user touch efficiently. For instance, the screen may be displayed by the projector on a medium such as glass, plastic, or wooden plate, or may be displayed on a display to which a touch input device is not separately added.

The signal processing unit 30 may preferably include an analogue-to-digital (A/D) converter to convert the analogue electric signal generated at the grid 25 into digital signal. The A/D converter may be a device to convert a measurement signal with respect to general analogue physical quantity into a digital signal.

It is necessary to measure analogue physical quantities such as voltage, current, temperature, humidity, pressure, flow rate, velocity, or acceleration, convert the measurement into digital value and read in the converted values, and Data Acquisition System (DAS) may be implemented to provide above-mentioned functions. The DAS may include a sensor, an A/D converter, and a computer.

The sensor operates to convert physical quantity to be measured into electrical quantity such as voltage, current or frequency, and the A/D converter operates to convert the sensed value into parallel or serial data which is readable on a computer. In most cases, a filter to remove noise between the sensor and the A/D converter and exclusively extract intended signal, or a wave shaping circuit such as an amplifier to convert the signal into an appropriate size, may be implemented.

As explained above, the signal processing unit 30 in one embodiment may additionally include a device such as filter or amplifier to measure elastic wave at the piezoelectric grid 25 and convert the measured signal into a digital signal for analysis to generate measurement or reception signal accurately and efficiently to thus enable the touch point calculating unit 40 to calculate the location of touch accurately.

In one embodiment, depending on choice by those skilled in the art, the touch point calculating unit 40 may include a calculating unit including micro controller unit (MCU) and a controller card which calculates the location. The controller card may convert the digital signals from the respective grid points extracted at the signal processing unit 30 into matrix coordinate system on the touch plate 20 and designate an exact location. Such controller card enables to extract X and Y coordinates of the received signal on the grid 25, so that the MCU extracts the X and Y coordinates on the grid 25 of the initial signal and calculates the location of point.

In the above-explained structure, if a user touches a predetermined point on the screen 21 provided for touch input, vibration or elastic wave is generated from the point ("touch point"). The generated elastic wave is transferred in all directions through the medium of the screen 21 provided for touch input, and reaches the grid 25 formed on the first and second sensor bars 11, 12. As the elastic wave transferred from the touch point reaches the respective grids 25, and the grids 25 made from piezoelectric material are subject to pressure or stress due to the elastic wave, to thereby generate an electric signal.

The electric signals received from the respective grids 25 are received at the signal processing unit 30, and converted into digital signal so that the touch point calculating unit 40 analyzes the digital signal to calculate the location of touch. In one embodiment, the touch point calculating unit 40 may extract the location on the grid 25 where, among the above-mentioned signals, the elastic wave signal is first received. If the location on the grid 25 is calculated, an intersecting point is extracted from the extended lines from the grid 25 extracted from a matrix of the screen 21 provided for touch input, and the intersecting point is calculated as the touch point.

As used herein, the 'elastic wave' refers to all types of elastic wave including longitudinal and transversal waves that need medium, since the elastic wave conveys energy due to change in disturbance status in an elastic medium. An example of elastic wave includes sound wave which mainly uses air as medium, water wave which uses water as a medium, or seismic wave which uses interior substance of Earth. The elastic wave is frequently called dynamic wave, since the wave energy exists in the form of kinetic energy and potential energy. On the contrary, electromagnetic wave is non-elastic wave since this is transmitted without requiring a medium.

The elastic wave is transmitted in the same form as the vibration wave in the medium of the screen 21 provided for touch input. When a user touches the screen 21 provided for touch input, the elastic wave starts propagating from the location of touch. The elastic wave first reaches the grid 25 in the shortest distance from the location of touch, and this point corresponds to the touch point grid spot to calculate the location of touch.

Each grid 25 at the location of touch absorbs elastic wave or vibration wave, and since the grid 25 is made from piezoelectric material, distortional stress of the grid 25 due to wave energy is applied, and as a result, the piezoelectric grid 25 generates an electric signal. Gaps between the grids 25 may preferably be formed in nano-scale to enable accurate determination of the location of touch, and increase sensitivity to vibration.

The piezoelectric material has induced polarization in response to an external mechanical pressure applied thereto or mechanical deformation due to external electromagnetic field. Crystal used in electric watch is the representative example thereof. If weak electricity is applied to the crystal, vibration occurs with frequency corresponding to the orientation or size of the crystal, in which the number of vibrations is calculated for use in watches.

PZT is the most widely used piezoelectric material, and has the constitution of $Pb(Zr, Ti)O^3$. The piezoelectric material is used in various applications including gas range ignition, ultrasound oscillator (for use in humidifier, ultrasound detector, nondestructive inspection), or piezoelectric transformer. The recent development has enabled very precise displacement, and various researches have been actively conducted to find the ways of using piezoelectricity in the field of actuator including atomic force microscopy (AFM), ultrasound motor, or the like.

As explained above, the piezoelectric grids 25 are subject to mechanical pressure or stress due to elastic wave applied in response to touch, and as a result, polarization is induced and electric signal is generated. The electric signal is electrically connected to the signal processing unit 30 by the grids 25 and wires.

The signal processing unit 30 converts the analog signal received at the respective grids 25 into digital signal, and divides the received signals at each point on the grid 25 along the extracted transversal and longitudinal axes by time or order of reception.

The touch point calculating unit 40 extracts the electric signal which is first received electric signal at each point on the grid 25, sets X and Y coordinates of the touch point (P) based on the point on the grid 25 where the electric signal is received, and calculates the location of the touch point.

The signal transmitting unit 50 transmits location information of the touch point calculated at the touch point calculating unit 40 to outside. As used herein, the 'outside' refers to an external computing device which needs the location information of the touch point. If the external device and the signal transmitting unit 50 are connected to each other by wire, the location information may be transmitted through the wire. If the external device and the signal transmitting unit 50 are communicatively connected to each other in wireless manner, it is also possible to transmit the location information of the touch point wirelessly. An embodiment is not limited to the manner of wireless communication. Accordingly, direct communication by Bluetooth, or alternatively, indirect communication by WiFi may be implemented. Further, various other types of wireless communication such as Zigbee, WLAN, or HomeRF may be adequately implemented.

As explained above, an embodiment relates to a system and a method for finding an accurate location of touch point by utilizing vibration wave or elastic wave generated in response to touch, in which the piezoelectric grid 25 generates an electric signal in response to stress by the wave, and the signal processing unit 30 and the touch point calculating unit 40 receive the signal, extract the first signal, and set X and Y coordinates based on the same.

Figure 21A:
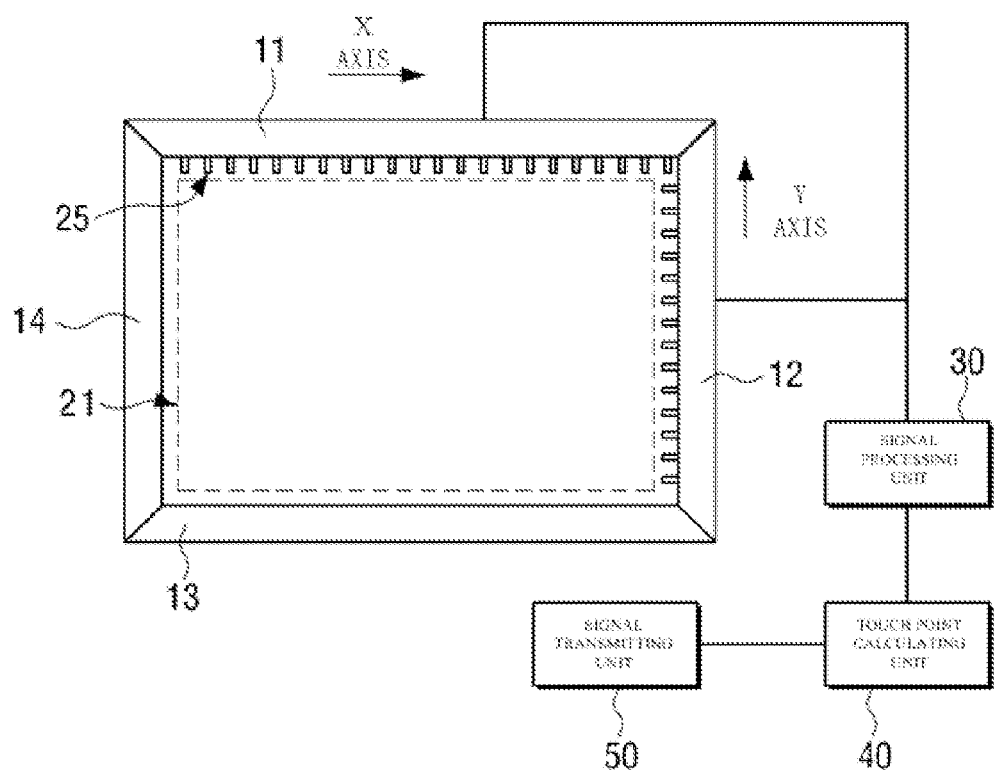
FIGS. 21A and 21B are schematic, block diagrams of a touch sensor system using vibration at a location of touch, according to another embodiment.
Figure 21B:
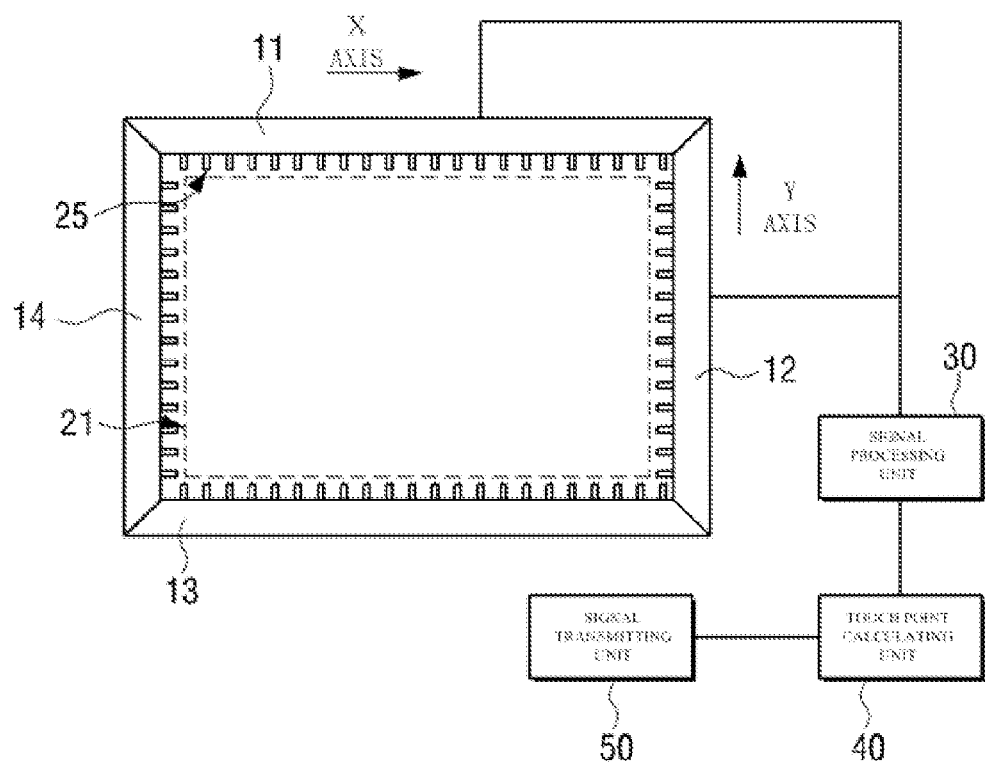

FIGS. 21A and 21B illustrate schematic, block diagrams of a touch sensor system using touch point vibration according to another embodiment, which includes additional side bars formed on a side line of the screen 21 provided for touch input on to which the first and second sensor bars 11, 12 corresponding to the first and second sensor bars 11, 12 are not coupled.

The additional side bars 13, 14 may provide support for the coupling of the first sensor bar 11 and the second sensor bar 12 as well as the user convenience of the touch sensor system. Referring to FIG. 21A, the additional side bar may be a general bar on which the piezoelectric grid is not formed, or referring to FIG. 21B, may have a grid made from the same piezoelectric material as the first sensor bar 11 and the second sensor bar 12 formed on one side surface thereof.

Adjacent ends of the first sensor bar 11, the second sensor bar 12, and the additional side bars 13 and 14 coupled on locations corresponding to the sensor bars 11 and 12 may be coupled in a separable manner, or may be integrated not to allow separation. Referring to FIG. 20, a bar fixing unit may be additionally provided.

Figure 22:
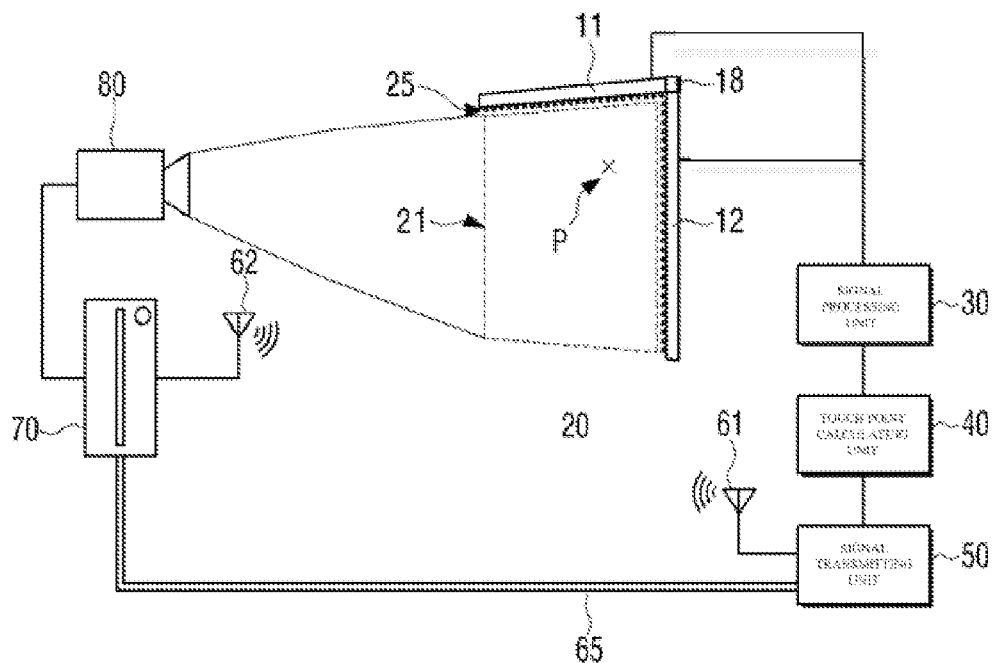
FIG. 22 is a view illustrating an example of a touch sensor system using vibration at a location of touch, according to another embodiment.

FIG. 22 illustrates a touch sensor system using touch point vibration according to another embodiment. By using the touch sensor system using touch point vibration, the touch on the screen that the projector 80 displays on a wall may be inputted and the information of the touch point may be provided to the external computing device 70.

Referring to FIG. 22, the computing device 70 may generate the screen 21 provided for touch input and transmit the screen 21 to the projector 80. The project may display the screen 21 on a wall. The wall plays the role of medium through which the elastic wave generated in response to touch propagates around. The first sensor bar 11 and the second sensor bar 12 formed on the piezoelectric grids 25 may be fixed on the wall according to the transversal X and the longitudinal Y side surfaces of the screen 21 provided for touch input.

To be specific, the ends of the first sensor bar 11 and the second sensor bar 12 may be coupled with each other by the bar fixing unit 18, in orthogonal relations according to the transversal X and the longitudinal Y side surfaces of the screen 21.

If the touch is inputted at P on the displayed screen on the screen 21 provided for touch input, the first and the second sensor bar 11 and 12, the signal processing unit 30 and the touch point calculating unit 40 may calculate the location information of the touch point P generated in response to touch. The location information of the touch point P may be transmitted by the signal transmitting unit 50 to the computing device 70. If the signal transmitting unit 50 and the computing device 70 are equipped with the wireless communication apparatus 61 and 62, and are connected wirelessly, the location information of P may be transmitted wirelessly. If both are connected by wire 65, the location information of P may be transmitted by wire.

Figure 23:
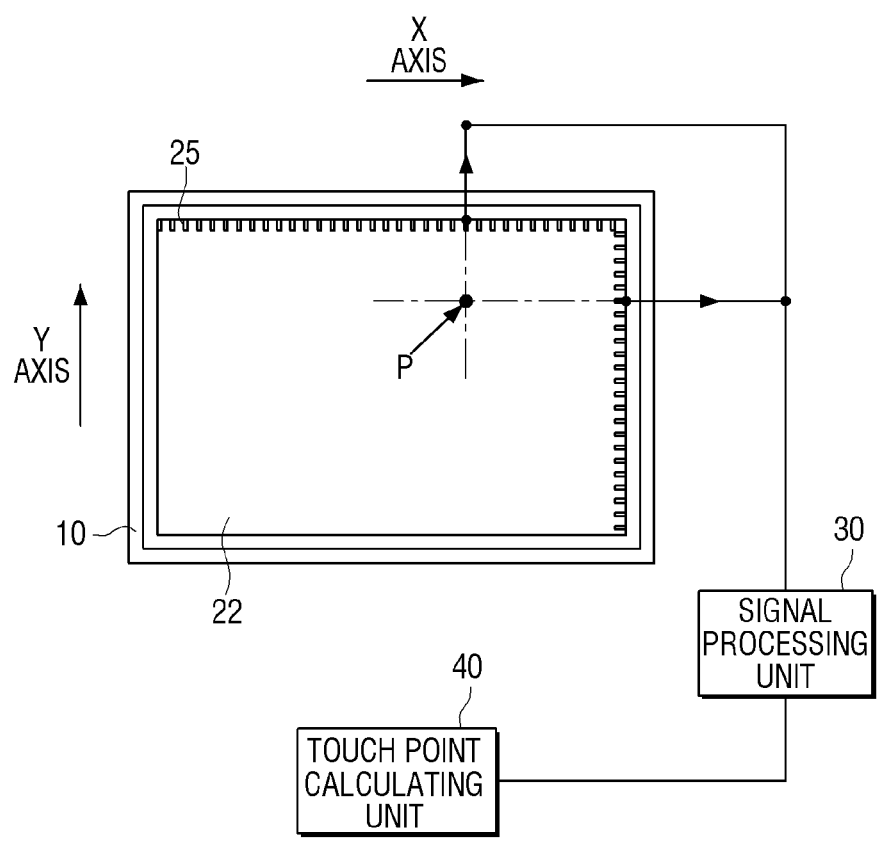
FIG. 23 is a schematic, block diagram of a touch sensor system using vibration at a location of touch, according to another embodiment.

FIG. 23 illustrates a schematic, block diagram of the touch sensor system using touch point vibration. Referring to FIG. 23, the system may include a translucent sheet 22 having a piezoelectric grid formed on any of transversal (X) and longitudinal (Y) side lines; a signal processing unit 30 connected to each of the grid to receive electric signal; and a touch point calculating unit 40 which extracts the first electric signal of the transversal (X) and longitudinal (Y) lines among the signals received at the signal processing unit 30 and calculates location of touch point using an intersecting point on an extended line from the extracted grid point.

As explained above, an embodiment may include the grids 25 made from piezoelectric material formed on the transversal and longitudinal side lines of the translucent sheet 22, which is one constituent of the display, the signal processing unit 30 which is electrically connected to each grid 25, and the touch point calculating unit 40 which calculates the location based on the signal.

The translucent sheet 22 may preferably be the glasses having high vibration transmissibility so that the vibration or the elastic wave from the touch point to the grids 25 may be transmitted with low loss rate to cause the stress on the grids 25 and to enhance the generating rate of the electric signals.

The signal processing unit 30 may include an analogue-to-digital (A/D) converter which converts an analogue signal generated from the grids 25 into a digital signal. The A/D converter converts a measurement signal with respect to general analogue physical quantity into a digital signal.

It is necessary to measure analogue physical quantities such as voltage, current, temperature, humidity, pressure, flow rate, velocity, or acceleration, convert the measurement into digital value and read in the converted values, and Data Acquisition System (DAS) may be implemented to provide the above-mentioned functions. The DAS may include a sensor, an A/D converter, and a computer.

The sensor operates to convert physical quantity to be measured into electrical quantity such as voltage, current or frequency, and the A/D converter operates to convert the sensed value into parallel or serial data which is readable on a computer. In most cases, a filter to remove noise between the sensor and the A/D converter and exclusively extract intended signal, or a wave shaping circuit such as an amplifier to convert the signal into an appropriate size, may be implemented.

As explained above, the signal processing unit 30 in one embodiment may additionally include a device such as filter or amplifier to measure elastic wave at the piezoelectric grid 25 and convert the measured signal into a digital signal for analysis to generate measurement or reception signal accurately and efficiently to thus enable the touch point calculating unit 40 to calculate the location of touch accurately.

The touch point calculating unit 40 may include a calculating unit including micro controller unit (MCU) and a controller card which calculates the location. The controller card may convert the digital signals from the respective grid points extracted at the signal processing unit 30 into matrix coordinate system on the touch plate 20 and designate an exact location. Such controller card enables to extract X and Y coordinates of the received signal on the grid 25, so that the MCU extracts the X and Y coordinates on the grid 25 of the initial signal and calculates the location of point.

In the above-explained structure, if a user touches a predetermined point on the translucent sheet 22, vibration or elastic wave is generated from the point ("touch point"). The generated elastic wave is transferred in all directions through the medium of the translucent sheet 22, and reaches the grid 25 formed on the first and second sensor bars 11, 12. As the elastic wave transferred from the touch point reaches the respective grids 25, and the grids 25 made from piezoelectric material are subject to pressure or stress due to the elastic wave, to thereby generate an electric signal.

The electric signals received from the respective grids 25 are received at the signal processing unit 30, and converted into digital signal so that the location of the grid 25 that first receives the signal, among the above-mentioned signals, is extracted. If the location on the grid 25 is extracted, an intersecting point is extracted from the extended lines from the grid 25 extracted from a matrix of the translucent sheet 22, and the intersecting point is calculated as the touch point.

As used herein, the 'elastic wave' refers to all types of elastic wave including longitudinal and transversal waves that need medium, since the elastic wave conveys energy due to change in disturbance status in an elastic medium. An example of elastic wave includes sound wave which mainly uses air as medium, water wave which uses water as a medium, or seismic wave which uses interior substance of Earth. The elastic wave is frequently called dynamic wave, since the wave energy exists in the form of kinetic energy and potential energy. On the contrary, electromagnetic wave is non-elastic wave since this is transmitted without requiring a medium.

The elastic wave is transmitted in the same form as the vibration wave in the medium like translucent sheet 22. When a user touches the screen, the elastic wave starts propagating from the location of touch. The elastic wave first reaches the grid 25 in the shortest distance from the location of touch, and this point corresponds to the touch point grid spot to calculate the location of touch.

Each grid 25 at the location of touch absorbs elastic wave or vibration wave, and since the grid 25 is made from piezoelectric material, distortional stress of the grid 25 due to wave energy is applied, and as a result, the piezoelectric grid 25 generates an electric signal. Gaps between the grids 25 may preferably be formed in nano-scale to enable accurate determination of the location of touch, and increase sensitivity to vibration.

The piezoelectric material has induced polarization in response to an external mechanical pressure applied thereto or mechanical deformation due to external electromagnetic field. Crystal used in electric watch is the representative example thereof. If weak electricity is applied to the crystal, vibration occurs with frequency corresponding to the orientation or size of the crystal, in which the number of vibrations is calculated for use in watches.

PZT is the most widely used piezoelectric material, and has the constitution of $Pb(Zr, Ti)O^3$. The piezoelectric material is used in various applications including gas range ignition, ultrasound oscillator (for use in humidifier, ultrasound detector, nondestructive inspection), or piezoelectric transformer. The recent development has enabled very precise displacement, and various researches have been actively conducted to find the ways of using piezoelectricity in the field of actuator including atomic force microscopy (AFM), ultrasound motor, or the like.

As explained above, the piezoelectric grids 25 are subject to mechanical pressure or stress due to elastic wave applied in response to touch, and as a result, polarization is induced and electric signal is generated. The electric signal is electrically connected to the signal processing unit 30 by the grids 25 and wires.

The signal processing unit 30 converts the analog signal received at the respective grids 25 into digital signal, and divides the received signals at each point on the grid 25 along the extracted transversal and longitudinal axes by time or order of reception.

The touch point calculating unit 40 extracts the electric signal which is first received electric signal at each point on the grid 25, sets X and Y coordinates of the touch point (P) based on the point on the grid 25 where the electric signal is received, and calculates the location of the touch point.

As explained above, an embodiment relates to a system and a method for finding an accurate location of touch point, in which the piezoelectric grid 25 generates an electric signal in response to vibration or elastic wave generated in response to touch, and the signal processing unit 30 and the touch point calculating unit 40 receive the signal, extract the first signal, and set X and Y coordinates based on the same.

Figure 24:
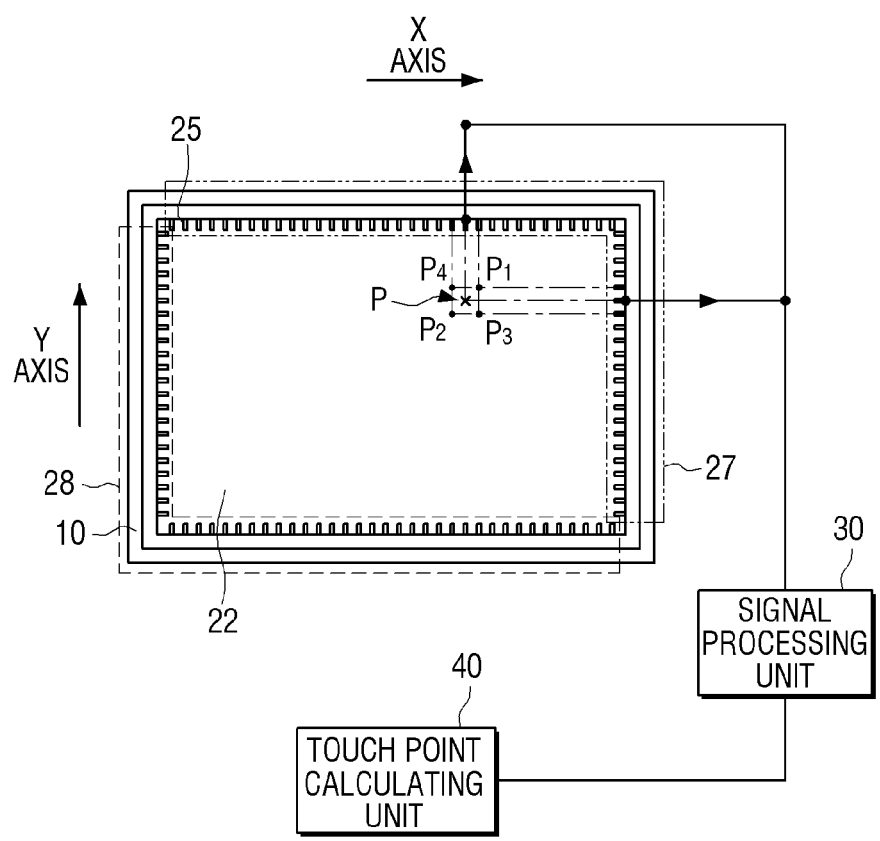
FIG. 24 is a schematic, block diagram of a touch sensor system using vibration at a location of touch, according to another embodiment.

FIG. 24 illustrates a schematic, block diagram of a touch sensor system using touch point vibration according to another embodiment. Referring to FIG. 24, an embodiment may include a piezoelectric grid 25 formed on a first side line of the transversal X and the longitudinal Y side surfaces; a translucent sheet 22 formed on a second side line opposite to the first line; a signal processing unit 30 connected to the grid 25 of the first line and the grid 25 of the second line to receive the electric signals; and a touch point calculating unit 40 which calculates the touch point location by extracting the line signals from the received electric signals of the first and the second lines, calculating the grid 25 location of the lines, and obtaining arithmetic mean of the intersecting points of the extended lines from the grid 25 that first receives the signal.

Since the signal processing unit 30 and the touch point calculating unit 40 are the same as those illustrated in FIG. 23, overlapping description will not be provided for the sake of brevity.

Referring to FIG. 24, an embodiment is characterized of the piezoelectric grid 25 formed on the first line of the transversal X and the longitudinal Y side surfaces, and the translucent sheet 22 formed on the second side line counter to the first line, in which the piezoelectric grids 25 are formed at four edges of the square display which receives the vibration or the elastic wave generated from the touch point P or point of touch, and the locations of the touch point P is extracted therethrough so that the location of the touch point P is determined based on the arithmetic mean of the locations of the touch points P.

That is, the first grid line is formed on the transversal X and the longitudinal Y side surfaces of the grid 25, and the second line is formed opposite to the first line, so that the elastic wave transmitted in four directions are received at the grids 25 on the respective lines when touch is inputted. Considering all the reference grids 25 for the coordinates (x, y) of the first line 27 and the second line 28, four intersecting points (X,Y), i.e., $(X, Y(P_1))$ of the first line 27, $(X, Y(P_3))$ of the second line 28, (X of the second line 28, $Y(P_4)$) of the first line 27, and (X, $Y(P_2)$) of the second line 28, may be found. The touch point may be calculated based on arithmetic mean of the four intersecting points. Further, the touch point P may be calculated based on the arithmetic mean of the four intersecting points $(P_1, P_2, P_3, \text{and } P_4)$ calculated from the coordinates of the first line 27 and the second line 28.

In one embodiment, advantageously, it is possible to find the accurate touch point P by extracting the intersecting points from the two axes of the coordinates and obtaining the arithmetic mean of the extracted values, rather than using one grid 25 in X and one grid 25 in Y to calculate the location of touch point P.

Figure 25:
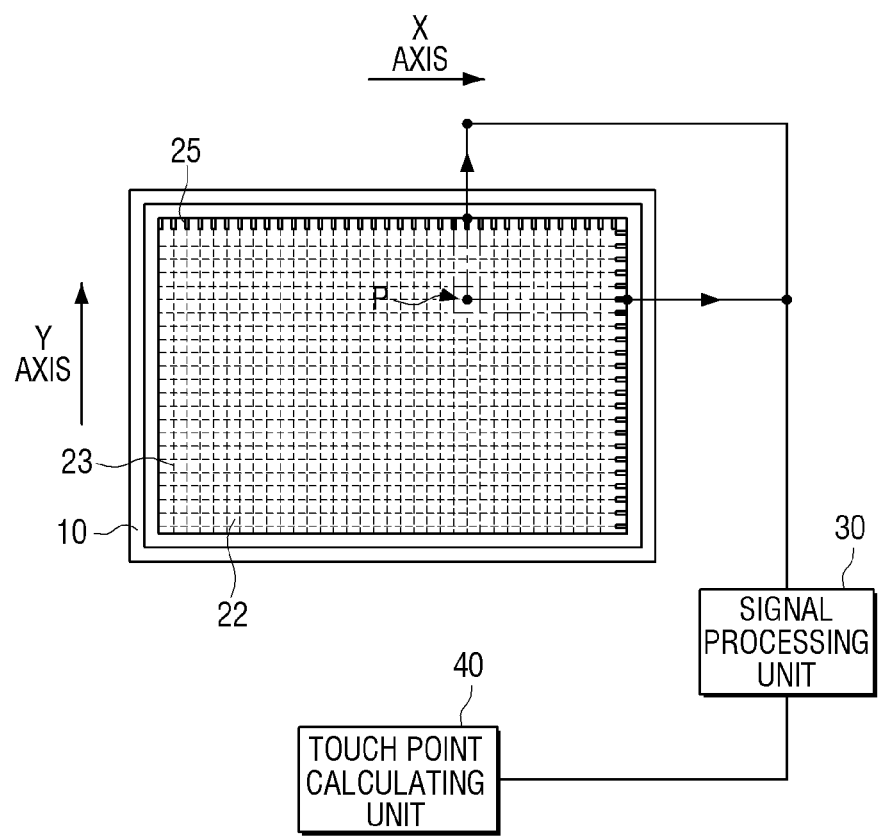
FIG. 25 is a schematic, block diagram of a touch sensor system using vibration at a location of touch in which a transparent sheet is patterned, according to another embodiment.

FIG. 25 illustrates a schematic, block diagram of a touch sensor system using touch point vibration according to another embodiment, which includes a patterned translucent sheet 22. Referring to FIG. 25, since the constitution is almost identical to that of FIG. 23 the translucent sheet 22 in the form of patterned matrix will be described in detail below, while other overlapping parts will not be explained for the sake of brevity.

If the touch is inputted on the display, the vibration or the elastic wave propagates in all directions from the touch point P. Herein, considering that there is a linear path from P to the nearest grid, the translucent sheet 22 in the form of trench pattern matrix with predetermined depth and gaps may be provided. This enhances the transmissibility of the elastic wave and reduces the noises may be reduced, thereby enhancing the responsiveness and the accuracy. The depth and gaps of the patterning may be determined appropriately by considering highest responsiveness and accuracy.

Figure 26:
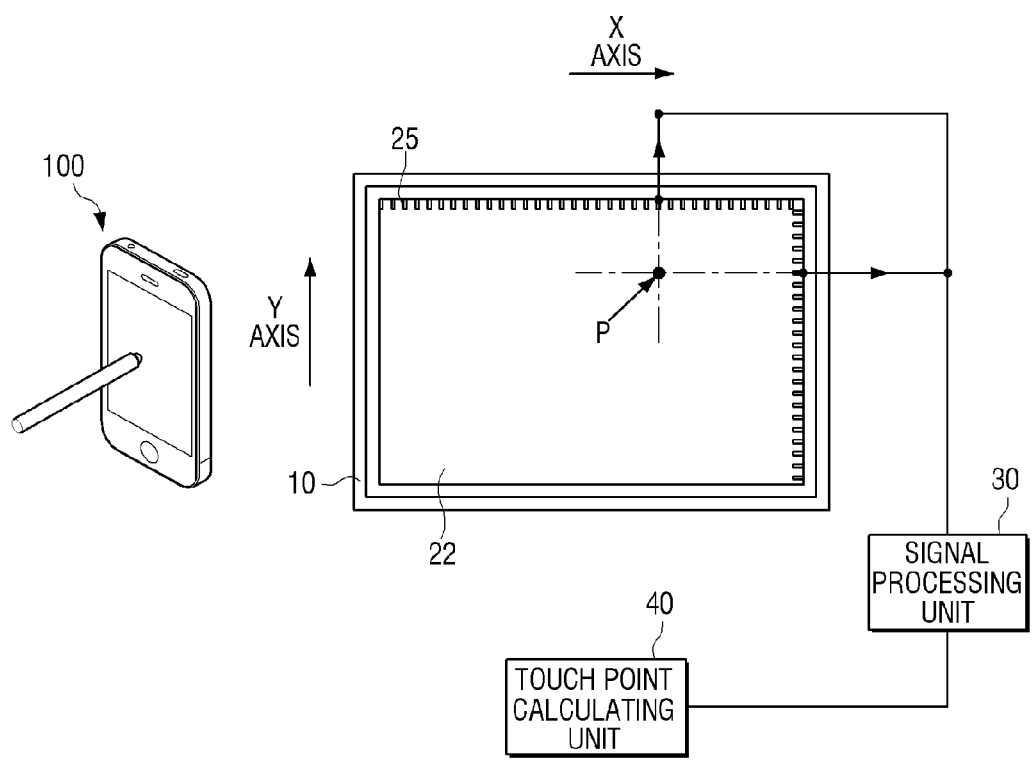
FIG. 26 is a schematic, block diagram of a touch sensor system using vibration at a location of touch, which is implemented on a mobile device, according to another embodiment.

FIG. 26 illustrates a schematic, block diagram of the sensor system used in a mobile device using a touch sensor for sensing the touch point vibration, according to another embodiment. Referring to FIG. 26, the mobile device 100 may include a display unit including a display device and a touch screen device, a central processing unit (CPU) and a communicating unit, in which the touch screen device may include a translucent sheet 22 having a piezoelectric grid formed on any of transversal (X) and longitudinal (Y) side lines; a signal processing unit 30 connected to each of the grid to receive electric signal; and a touch point calculating unit 40 which extracts the first electric signal of the transversal (X) and longitudinal (Y) lines among the signals received at the signal processing unit 30 and calculates location of touch point using an intersecting point on an extended line from the extracted grid point.

The mobile device may preferably be one of mobile phone, PDA, tablet PC, or any other various mobile devices. Because the mobile device places importance in portability, convenience and durability, an embodiment may be applied in various mobile devices to provide high degree of design freedom.

The mobile device 100 may include a signal processing unit 30 which has the piezoelectric grid 25 on the transversal and the longitudinal lines of the translucent sheet 22, and is electrically connected with the grids 25, and a touch point calculating unit 40 which calculates the location based on the signals.

The translucent sheet 22 may preferably be the glasses having high vibration transmissibility so that the vibration or the elastic wave from the touch point to the grids 25 may be transmitted with low loss rate to cause the stress on the grids 25 and to enhance the generating rate of the electric signals.

The signal processing unit 30 may include an analogue-to-digital (A/D) converter which converts an analogue signal generated from the grids 25 into a digital signal. The A/D converter converts a measurement signal with respect to general analogue physical quantity into a digital signal.

It is necessary to measure analogue physical quantities such as voltage, current, temperature, humidity, pressure, flow rate, velocity, or acceleration, convert the measurement into digital value and read in the converted values, and Data Acquisition System (DAS) may be implemented to provide the above-mentioned functions. The DAS may include a sensor, an A/D converter, and a computer.

The sensor operates to convert physical quantity to be measured into electrical quantity such as voltage, current or frequency, and the A/D converter operates to convert the sensed value into parallel or serial data which is readable on a computer. In most cases, a filter to remove noise between the sensor and the A/D converter and exclusively extract intended signal, or a wave shaping circuit such as an amplifier to convert the signal into an appropriate size, may be implemented.

As explained above, the signal processing unit 30 in one embodiment may additionally include a device such as filter or amplifier to measure elastic wave at the piezoelectric grid 25 and convert the measured signal into a digital signal for analysis to generate measurement or reception signal accurately and efficiently to thus enable the touch point calculating unit 40 to calculate the location of touch accurately.

The touch point calculating unit 40 may include a calculating unit including micro controller unit (MCU) and a controller card which calculates the location. The controller card may convert the digital signals from the respective grid points extracted at the signal processing unit 30 into matrix coordinate system on the touch plate 20 and designate an exact location. Such controller card enables to extract X and Y coordinates of the received signal on the grid 25, so that the MCU extracts the X and Y coordinates on the grid 25 of the initial signal and calculates the location of point.

In the above-explained structure, if a user touches a predetermined point on the translucent sheet 22, vibration or elastic wave is generated from the point ("touch point"). The generated elastic wave is transferred in all directions through the medium of the translucent sheet 22, and reaches the respective grids 25. As the elastic wave transferred from the touch point reaches the respective grids 25, and the grids 25 made from piezoelectric material are subject to pressure or stress due to the elastic wave, to thereby generate an electric signal.

The electric signals received from the respective grids 25 are received at the signal processing unit 30, and converted into digital signal so that the location of the grid 25 that first receives the signal, among the above-mentioned signals, is extracted. If the location on the grid 25 is extracted, an intersecting point is extracted from the extended lines from the grid 25 extracted from a matrix of the translucent sheet 22, and the intersecting point is calculated as the touch point.

As used herein, the 'elastic wave' refers to all types of elastic wave including longitudinal and transversal waves that need medium, since the elastic wave conveys energy due to change in disturbance status in an elastic medium. An example of elastic wave includes sound wave which mainly uses air as medium, water wave which uses water as a medium, or seismic wave which uses interior substance of Earth. The elastic wave is frequently called dynamic wave, since the wave energy exists in the form of kinetic energy and potential energy. On the contrary, electromagnetic wave is non-elastic wave since this is transmitted without requiring a medium.

The elastic wave is transmitted in the same form as the vibration wave in the medium like translucent sheet 22. When a user touches the screen, the elastic wave starts propagating from the location of touch. The elastic wave first reaches the grid 25 in the shortest distance from the location of touch, and this point corresponds to the touch point grid spot to calculate the location of touch.

Each grid 25 at the location of touch absorbs elastic wave or vibration wave, and since the grid 25 is made from piezoelectric material, distortional stress of the grid 25 due to wave energy is applied, and as a result, the piezoelectric grid 25 generates an electric signal. Gaps between the grids 25 may preferably be formed in nano-scale to enable accurate determination of the location of touch, and increase sensitivity to vibration.

The piezoelectric material has induced polarization in response to an external mechanical pressure applied thereto or mechanical deformation due to external electromagnetic field. Crystal used in electric watch is the representative example thereof. If weak electricity is applied to the crystal, vibration occurs with frequency corresponding to the orientation or size of the crystal, in which the number of vibrations is calculated for use in watches.

PZT is the most widely used piezoelectric material, and has the constitution of $Pb(Zr, Ti)O^3$. The piezoelectric material is used in various applications including gas range ignition, ultrasound oscillator (for use in humidifier, ultrasound detector, nondestructive inspection), or piezoelectric transformer. The recent development has enabled very precise displacement, and various researches have been actively conducted to find the ways of using piezoelectricity in the field of actuator including atomic force microscopy (AFM), ultrasound motor, or the like.

As explained above, the piezoelectric grids 25 are subject to mechanical pressure or stress due to elastic wave applied in response to touch, and as a result, polarization is induced and electric signal is generated. The electric signal is electrically connected to the signal processing unit 30 by the grids 25 and wires.

The signal processing unit 30 converts the analog signal received at the respective grids 25 into digital signal, and divides the received signals at each point on the grid 25 along the extracted transversal and longitudinal axes by time or order of reception.

The touch point calculating unit 40 extracts the electric signal which is first received electric signal at each point on the grid 25, sets X and Y coordinates of the touch point (P) based on the point on the grid 25 where the electric signal is received, and calculates the location of the touch point.

As explained above, an embodiment relates to a system and a method for finding an accurate location of touch point, in which the piezoelectric grid 25 generates an electric signal in response to vibration or elastic wave generated in response to touch, and the signal processing unit 30 and the touch point calculating unit 40 receive the signal, extract the first signal, and set X and Y coordinates based on the same.

Unlike the conventional touch screen devices, an embodiment does not require peripherals such as the ITO film, the dot spacer, or the high frequency oscillator. Further, the mobile device 100 having the touch screen apparatus with fast recognition rate and responsiveness using simple grid pattern and the processor provided in the mobile device 100

Figure 27:
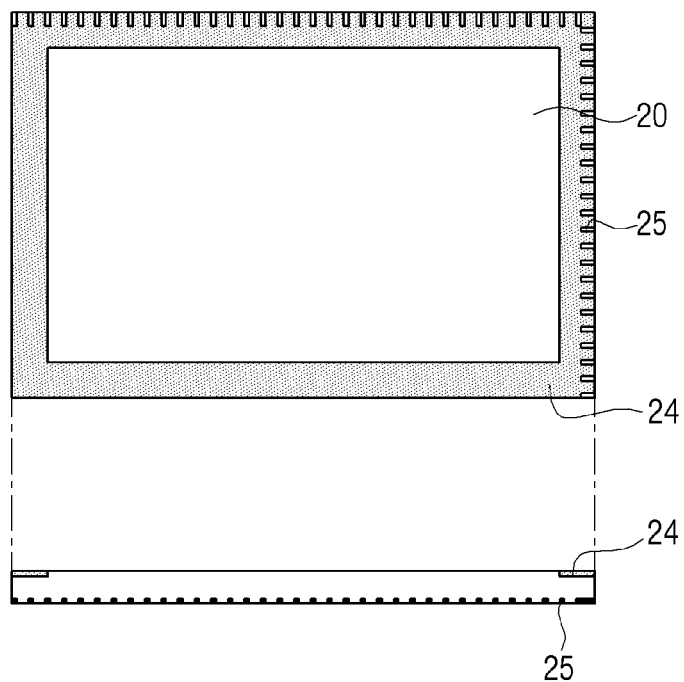
FIG. 27 is a view illustrating rear and side surfaces of a transparent sheet of a touch screen device implemented on a mobile device, according to another embodiment.

FIG. 27 illustrates rear and side surfaces of the translucent sheet of the touch screen apparatus applied in the mobile device 100 according to another embodiment. Referring to FIG. 27, the translucent sheet 22 may include the grids 25 in the size of tens of nano of the piezoelectric material formed on the transversal and longitudinal side surfaces on a lower surface of the glass sheet having high transmissibility of the vibration or the elastic wave, and a window frame 24 formed on an upper surface to cover the grid pattern. If the grid pattern is exposed outside, this will degrade the appearance. Additionally, it is also necessary to clearly distinguish the boundary of the touch point, by forming an opaque window frame 24 around the outer boundary of the touch screen.

The opaque window frame 24 may be implemented by attaching an opaque sheet in the form of window frame of a predetermined length, or coating such opaque sheet. It may also be possible to use sheets of different colors, if needed.

Figure 28:
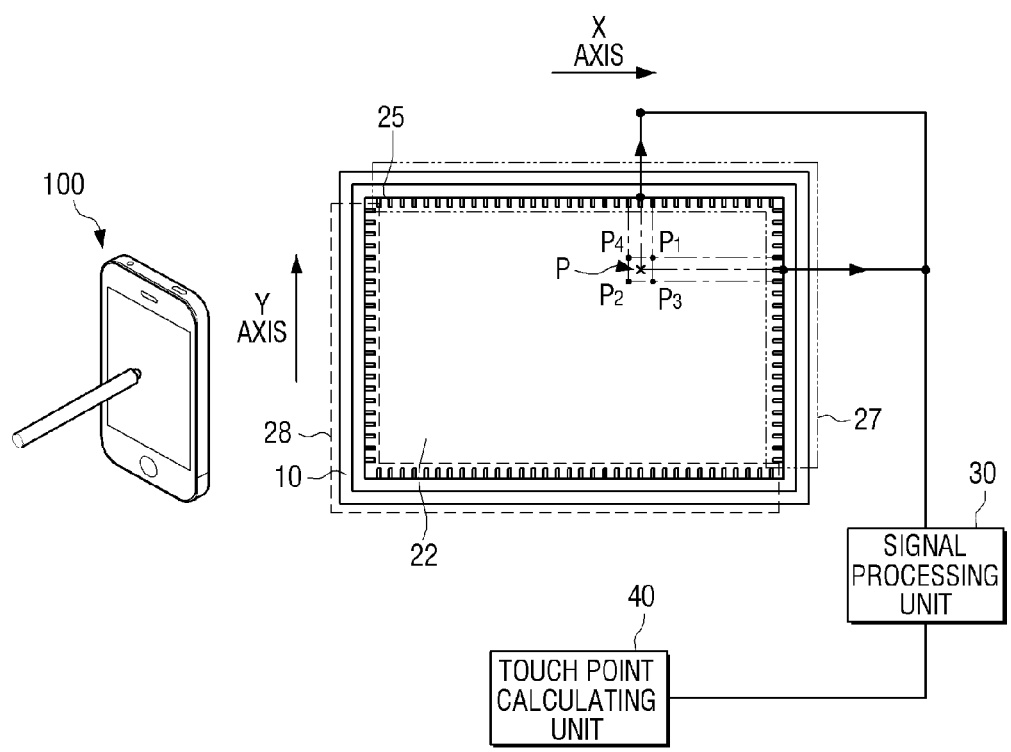
FIG. 28 is a schematic, block diagram of a sensor system implemented on a mobile device using an vibration sensing touch sensor of a location of touch, according to another embodiment.

FIG. 28 illustrates a schematic, block diagram of a sensor system used in the mobile device 100 using the touch sensor sensing touch point vibration according to another embodiment. Referring to FIG. 28, the touch screen apparatus may include a translucent sheet 22 having a piezoelectric grid formed on a first line of any of transversal (X) and longitudinal (Y) side lines and on a second line of the other of transversal (X) and longitudinal (Y) side lines facing the first line; a signal processing unit 30 connected to each of the grid of the first and second lines to receive electric signal; and a touch point calculating unit 40 which extracts the signal of each line from among the electric signals of the first and second lines received at the signal processing unit and calculates location of touch point by calculating arithmetic mean of an intersecting point on respectively extended lines from the first signal grid point.

Since the signal processing unit 30 and the touch point calculating unit 40 are the same as those illustrated in FIG. 26, overlapping description will be omitted for the sake for brevity.

Referring to FIG. 28, the piezoelectric grids 25 may be formed on the first line of the transversal X and the longitudinal Y side surfaces, and the translucent sheet 22 may be formed on the second line opposite to the first line. The piezoelectric grids 25 may be formed on the four edges of the square display to receive the vibration or the elastic wave generated from P or the touch point may arrive at the grids 25, and the locations of touch points P are extracted and used for calculation of arithmetic mean to determine the location of touch point P.

That is, the first grid line is formed on the transversal X and the longitudinal Y side surfaces of the grid 25, and the second line is formed opposite to the first line, so that the elastic wave transmitted in four directions are received at the grids 25 on the respective lines when touch is inputted. Considering all the reference grids 25 for the coordinates (x, y) of the first line 27 and the second line 28, four intersecting points (X, Y), i.e., $(X, Y(P_1))$ of the first line 27, $(X, Y(P_3))$ of the second line 28, (X of the second line 28, $Y(P_4)$) of the first line 27, and $(X, Y(P_2))$ of the second line 28, may be found. The touch point may be calculated based on arithmetic mean of the four intersecting points. Further, the touch point P may be calculated based on the arithmetic mean of the four intersecting points $(P_1, P_2, P_3,$ and $P_4)$ calculated from the coordinates of the first line 27 and the second line 28.

In one embodiment, advantageously, it is possible to find the accurate touch point P by extracting the intersecting points from the two axes of the coordinates and obtaining the arithmetic mean of the extracted values, rather than using one grid 25 in X and one grid 25 in Y to calculate the location of touch point P.

Figure 29:
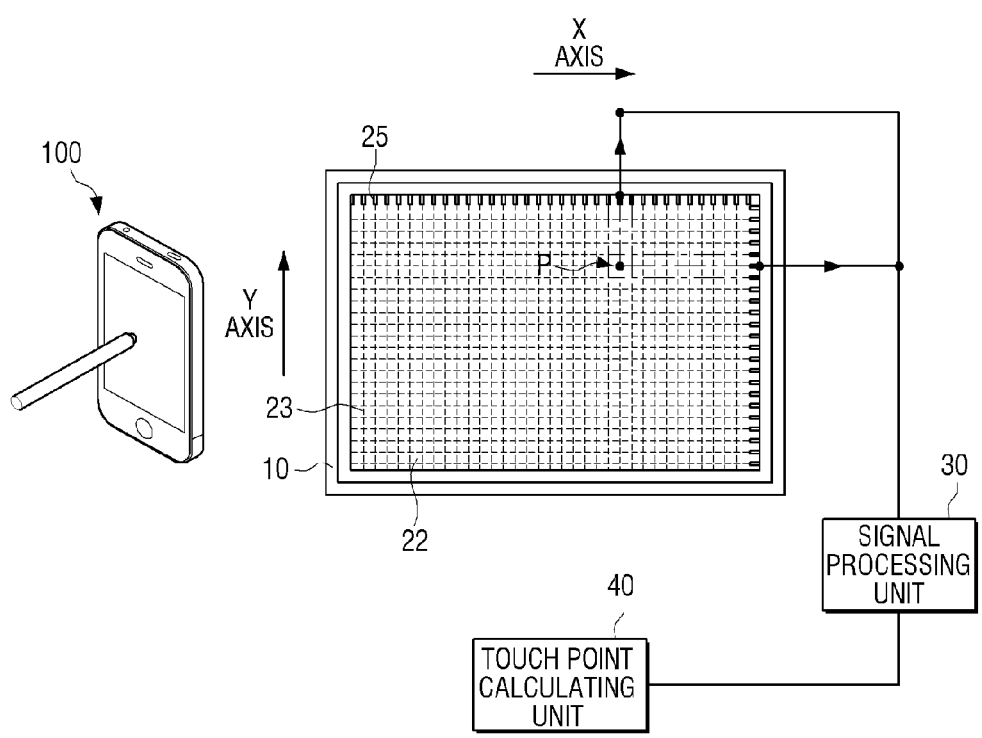
FIG. 29 is a schematic, block diagram of a sensor system implemented on a mobile device which uses a touch sensor for sensing vibration at a location of touch, in which touch screen device has a transparent sheet patterned therein, according to another embodiment.

FIG. 29 illustrates a schematic, block diagram of a sensor system used in the mobile device 100 using the touch sensor sensing touch point vibration according to another embodiment, in which the translucent sheet of the touch screen apparatus is patterned.

Referring to FIG. 29, most of the constitutions of the translucent sheet 22 are similar to the embodiment illustrated in FIG. 26, except that the translucent sheet 22 is patterned into a matrix form.

If the touch is inputted on the display, the vibration or the elastic wave propagates in all directions from the touch point P. Herein, considering that there is a linear path from P to the nearest grid, the translucent sheet 22 in the form of trench pattern matrix with predetermined depth and gaps may be provided. This enhances the transmissibility of the elastic wave and reduces the noises may be reduced, thereby enhancing the responsiveness and the accuracy. The depth and gaps of the patterning may be determined appropriately by considering highest responsiveness and accuracy.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A touch sensor system using touch point vibration, the touch sensor system comprising:
   a first sensor bar which comprises a grid made from a piezoelectric material formed on one side surface thereof;
   a second sensor bar which comprises a grid made from a piezoelectric material formed on one side surface thereof;

a touch plate having the first and second sensor bars respectively coupled to transversal (X) and longitudinal (Y) side surfaces thereof, and wherein the touch plate is patterned with a trench pattern in a matrix form that directly corresponds to the grid of the first sensor bar and the grid of the second sensor bar;

a signal processing unit connected to the first and second sensor bars to receive an electric signal; and a touch point calculating unit which calculates a location of touch with respect to the touch plate and the trench pattern based on the electric signal received at the signal processing unit.

2. The touch sensor system of claim 1, wherein the touch plate is made from a material with a constant vibration attenuation coefficient.

3. The touch sensor system of claim 1, wherein the first and second sensor bars are coupled to one of front, side or rear surfaces of the touch plate.

4. The touch sensor system of claim 1, further comprising a signal transmitting unit which transmits location information regarding the touch point calculated at the touch point calculating unit to outside.

5. The touch sensor system of claim 1, wherein the grids are at distance ranging between 10 nm and 100 nm.

6. A touch sensor system using touch point vibration, comprising:

a first sensor bar having a piezoelectric grid formed on a side surface thereof;

a second sensor unit having a piezoelectric grid formed on a side surface thereof, and connected at one end to an end of the first sensor bar in a perpendicular relation;

a screen having the first and second sensor bars respectively coupled to transversal (X) and longitudinal (Y) side surfaces thereof, wherein the screen is patterned with a trench pattern in a matrix form that directly corresponds to the piezoelectric grid of the first sensor bar and the piezoelectric grid of the second sensor bar;

a signal processing unit connected to the first and second sensor units to receive an electric signal; and a touch point calculating unit which calculates a location of touch with respect to the screen through which the touch is inputted and the trench pattern, based on the electric signal received at the signal processing unit.

7. The touch sensor system of claim 6, further comprising a bar fixing unit coupled to an end of each of the first and second sensor bars to fix the first and second sensor bars at a perpendicular relation with each other.

8. The touch sensor system of claim 6, further comprising a boundary detecting unit which perceives a touch made outside a boundary line of an end of each of the first and second bars.

9. The touch sensor system of claim 6, wherein the boundary detecting unit is a grid made from piezoelectric material.

10. The touch sensor system of claim 6, further comprising a signal transmitting unit which transmits location information about the touch point calculated at the touch point calculating unit to outside.

11. The touch sensor system of claim 6, further comprising:

a first additional side bar which is formed at a location facing the second sensor bar and connected to other end of the first sensor bar; and a second additional side bar which is formed at a location facing the first sensor bar and connected to the other end of the second sensor bar.

12. The touch sensor system of claim 11, wherein the first and second additional side bars each comprises a piezoelectric grid formed on a side surface thereof.

13. The touch sensor system of claim 11, further comprising a signal transmitting unit which transmits location information of the touch point calculated at the touch point calculating unit to outside.

\* \* \* \* \*